United States Patent
Tanaka et al.

(10) Patent No.: US 8,330,374 B2
(45) Date of Patent: Dec. 11, 2012

(54) VEHICLE-MOUNTED LOAD CONTROLLER, VEHICLE-MOUNTED HEADLIGHT DEVICE, AND VEHICLE-MOUNTED TAILLIGHT DEVICE

(75) Inventors: Toshifumi Tanaka, Toyonaka (JP); Tomoyuki Nakano, Sakai (JP)

(73) Assignee: Panasonic Corporation, Osaka (JP)

( * ) Notice: Subject to any disclaimer, the term of this patent is extended or adjusted under 35 U.S.C. 154(b) by 265 days.

(21) Appl. No.: 12/667,714

(22) PCT Filed: Jul. 16, 2008

(86) PCT No.: PCT/JP2008/062829
§ 371 (c)(1),
(2), (4) Date: Jan. 5, 2010

(87) PCT Pub. No.: WO2009/014041
PCT Pub. Date: Jan. 29, 2009

(65) Prior Publication Data
US 2011/0018441 A1  Jan. 27, 2011

(30) Foreign Application Priority Data

Jul. 26, 2007  (JP) .................................. 2007-195161

(51) Int. Cl.
*B60Q 1/14* (2006.01)
(52) U.S. Cl. ................. 315/77; 315/80; 315/82
(58) Field of Classification Search .......... 315/77, 315/80, 82, 291, 299, 307, 308, 312, 320, 315/324; 307/10.1, 10.8
See application file for complete search history.

(56) References Cited

U.S. PATENT DOCUMENTS 3,881,128 A * 4/1975 Douglas et al. ............... 315/83
(Continued)

FOREIGN PATENT DOCUMENTS

GB  2321141  7/1998
(Continued)

OTHER PUBLICATIONS

European Search Report for the corresponding European Patent Application No. 08791224, dated Aug. 12, 2011.

(Continued)

*Primary Examiner* — Tung X Le
(74) *Attorney, Agent, or Firm* — Greenblum & Bernstein, P.L.C.

(57) ABSTRACT

A vehicle-mounted load controller is characterized by including: a power terminal connected to a power line through a fuse; load connecting portions to which loads having vehicle-mounted light sources are connected; switches which are provided corresponding to the load connecting portions and which control states of power supply from the power line connected to the power terminal to the light sources connected to the load connecting portions; and a control unit which controls the switches in response to inputted control signals. The vehicle-mounted load controller is characterized in that the multiple load connecting portions to which the multiple light sources for different uses are respectively connected are electrically connected to the power terminal, and that each of the switches stops the supply of power from the power line to the light source connected to the corresponding load connecting portion when the magnitude of current flowing through the light source reaches or exceeds a predetermined value. A rise in lamp voltage during a period from the start of lighting to the establishment of stable lighting is reduced with consideration given to a history of lighting conditions for stable lighting. This produces effects such as increasing the lives of lamps and reducing the frequency of occurrence of arc jumping.

17 Claims, 23 Drawing Sheets

U.S. PATENT DOCUMENTS

| | | | | |
|---|---|---|---|---|
| 4,667,129 A * | 5/1987 | Papillon | | 315/82 |
| 4,727,261 A * | 2/1988 | Fairchild | | 307/10.1 |
| 4,841,198 A * | 6/1989 | Wilhelm | | 315/82 |
| 5,182,494 A * | 1/1993 | Segaud | | 315/80 |
| 5,498,929 A * | 3/1996 | Formwalt, Jr. | | 315/77 |
| 5,614,788 A * | 3/1997 | Mullins et al. | | 315/82 |
| 5,680,098 A | 10/1997 | Bejster et al. | | |
| 5,894,394 A | 4/1999 | Baba et al. | | |
| 5,926,010 A | 7/1999 | Hosokawa et al. | | |
| 7,482,756 B2 * | 1/2009 | Kesterson | | 315/82 |
| 7,525,254 B2 * | 4/2009 | Lys et al. | | 315/77 |
| 7,825,600 B2 * | 11/2010 | Stam et al. | | 315/82 |
| 2002/0047533 A1 | 4/2002 | Fushimi et al. | | |

FOREIGN PATENT DOCUMENTS

| | | |
|---|---|---|
| JP | 4-054838 | 2/1992 |
| JP | 4-54838 | 2/1992 |
| JP | 9-240391 | 9/1997 |
| JP | 10-59090 | 3/1998 |
| JP | 2002-087151 | 3/2002 |
| JP | 2004-186085 | 7/2004 |
| JP | 2006-7987 | 1/2006 |
| JP | 2006-7988 | 1/2006 |

OTHER PUBLICATIONS

China Office action, dated Aug. 5, 2011 (with English language translation).

Japan Official Action, mailed Apr. 24, 2012, for corresponding Japanese Patent Application.

Office Action, dated Jun. 4, 2012, in counterpart Chinese patent application from the State Intellectual Property Office (SIPO) of People's Republic of China (with English language translation).

Office Action, dated Jun. 13, 2012, in counterpart European patent application from the European Patent Office (EPO).

* cited by examiner

FIG. 5
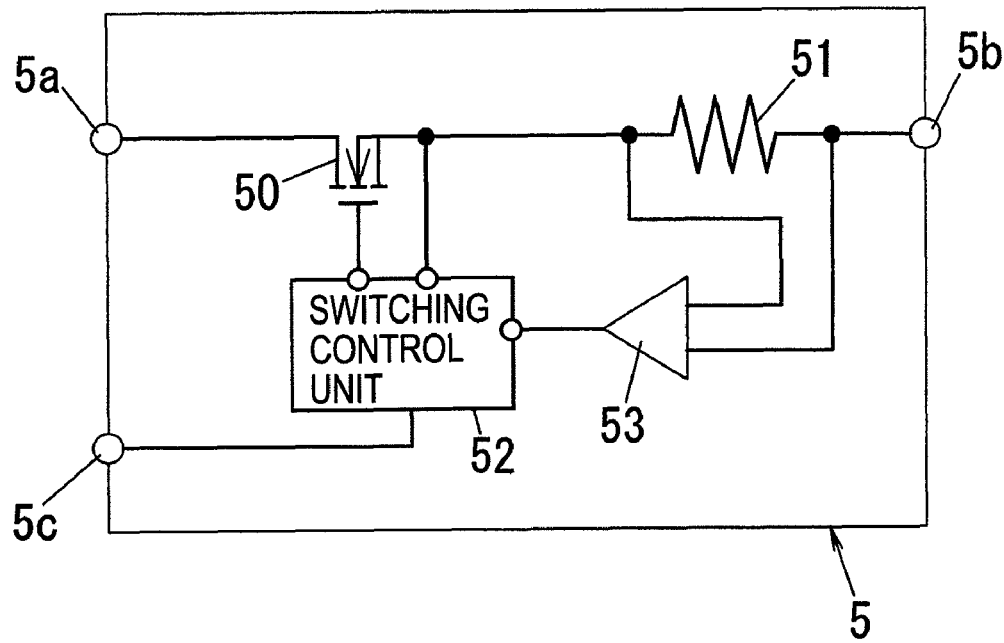
(a)
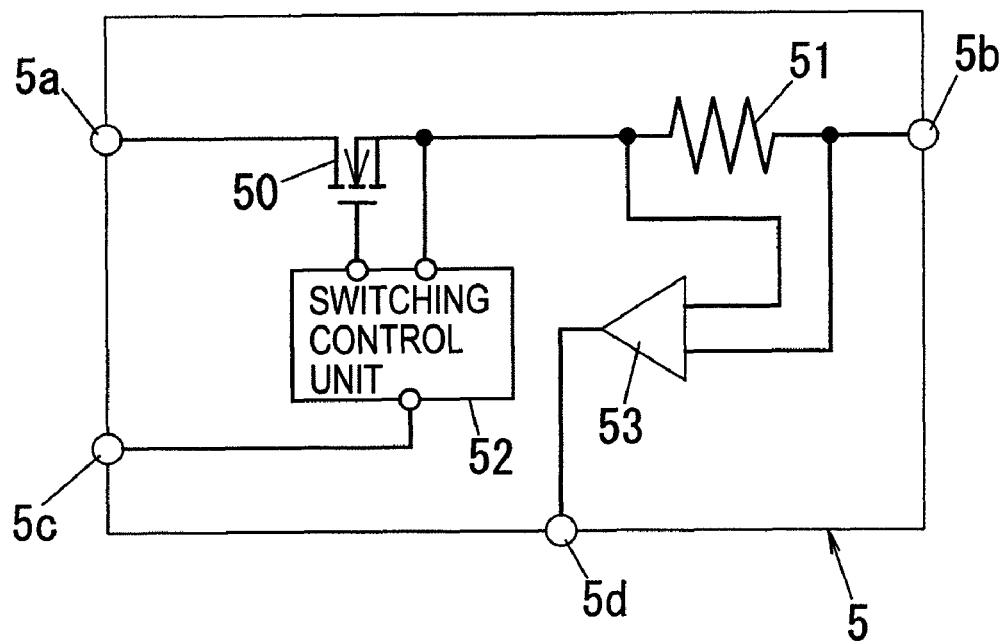
(b)

VEHICLE-MOUNTED LOAD CONTROLLER, VEHICLE-MOUNTED HEADLIGHT DEVICE, AND VEHICLE-MOUNTED TAILLIGHT DEVICE

TECHNICAL FIELD

The present invention relates to a vehicle-mounted load controller, a vehicle-mounted headlight device, and a vehicle-mounted taillight device.

BACKGROUND ART

Heretofore, vehicles have been provided with various loads for different uses, such as light sources used as vehicle-mounted exterior lamps including headlights, taillights, and the like.

For example, in a vehicle 100 shown in FIG. 1, a front lamp unit 120 is provided on each of the left and right sides of the front face of a vehicle body 110. The front lamp unit 120 includes, as loads, a headlight, a light source L (hereinafter denoted by sign L3 as needed) which is used as a width indicator, and a light source L (hereinafter denoted by sign L4 as needed) which is used as a blinker (winker). The headlight includes a light source L (hereinafter denoted by sign L1 as needed) for emitting a passing beam (also called a low beam), and a light source L (hereinafter denoted by sign L2 as needed) for emitting a driving beam (also called a high beam). As the light source L1, a high-intensity discharge lamp (HID lamp) or the like is used. As the light sources L2 to L4, halogen lamps or the like are used.

These light sources L1 and L2 are lit or extinguished in accordance with an operation by a user (mainly, driver). Electric power needed for the operation thereof is supplied from a battery (generally 12V) which is an unillustrated vehicle-mounted DC power supply. It should be noted that since the vehicle 100 shown in FIG. 1 includes as the light source L1 a high-intensity discharge lamp as described above, the vehicle 100 includes a lighting device 130 to generate power (AC power) for lighting the light source L1 from the electric power obtained from the battery.

Further, in the vehicle 100 shown in FIG. 1, the light sources L are lit or extinguished by the relay/fuse box 200 which distributes electric power from the vehicle-mounted battery to the loads. The vehicle-mounted battery is provided with multiple power lines S1 to S3. These power lines S1 to S3 are supplied with power under different conditions. For example, the power line S1 is a power line which is connected directly to a higher-potential terminal (positive terminal) of the battery and is always supplied with power. On the other hand, the power line S2 is connected to the battery through a switch or the like which is on when an ignition is on. The supply of power to the power line S2 is started when a user performs an operation for turning on the ignition, and is stopped when a user performs an operation for turning off the ignition. In other words, the power line S2 is a power line being activated in conjunction with the switch for the ignition. Moreover, the power line S3 is connected to the battery through a switch or the like which is turned on or off in accordance with the on/off of an engine. The supply of power to the power line S3 is started when a user performs an operation for turning on the engine, and is stopped when a user performs an operation for turning off the engine. In other words, the power line S3 is a power line being activated in conjunction with the switch for the engine.

As shown in FIG. 1, the relay/fuse box 200 includes a relay RY1 interposed between the lighting device 130 for lighting the light source L1 and the power line S1. When the relay RY1 is on, power is supplied from the power line S1 to the lighting device 130. Thus, the lighting device 130 generates AC power for lighting the light source L1, and supplies the AC power to the light source L1. As a result, the light source L1 is lit. On the other hand, when the relay RY1 is off, power is not supplied from the power line S1 to the lighting device 130. Accordingly, the lighting device 130 cannot generate AC power for lighting the light source L1, and the light source L1 is extinguished.

The relay/fuse box 200 further includes a relay RY2 interposed between the power line S1 and the light source L2, a relay RY3 interposed between the power line S1 and the light source L3, and a relay RY4 interposed between the power line S1 and the light source L4. In accordance with the on/off of each of these relays RY2 to RY4, the corresponding one of the light sources L2 to L4 is lit or extinguished.

These relays RY1 to R4 are turned on and off by a relay control unit (not shown) which is provided in the relay/fuse box 200 and which includes a microcomputer or the like. This relay control unit is connected to transmission lines N of an in-vehicle network such as a CAN (Controller Area Network). The relay control unit performs switching control (on-off control) on the relays RY1 to RY4 on the basis of vehicle information received through these transmission lines N. For example, the relay control unit turns on the relay RY1 when a user performs an operation for turning on the passing beam (turning on the light source L1), and turns off the relay RY1 when a user performs an operation for turning off the passing beam. Moreover, the relay control unit turns on/off the relay RY2 when a user performs an operation for turning on/off the driving beam (turning on/off the light source L2), turns on/off the relay RY3 when a user performs an operation for turning on/off the width indicator, and turns on/off the relay RY4 when a user performs an operation for turning on/off the blinker.

The relay/fuse box 200 further includes a fuse H1 interposed between the power line S1 and the relay RY1, a fuse H2 interposed between the power line S1 and the relay RY2, a fuse H3 interposed between the power line S1 and the relay RY3, and a fuse H4 interposed between the power line S1 and the relay RY4. These fuses H1 to H4 are provided to prevent a short-circuit or the like from causing the followings: a decrease in the voltage of the battery leads to such a shortage of battery voltage that the vehicle 100 will be rendered inoperative; and a large current flow results in smoking or firing or brakes a light source L.

In the vehicle 100, as shown in FIG. 2, rear lamp units 140 are provided as well as the front lamp units 120. The rear lamp units 140 are provided respectively on the left and right sides of the rear face of the vehicle body 110 of the vehicle 100. The rear lamp units 140 each include a light source L (hereinafter denoted by sign L5 as needed) for a backup light (reversing light), a light source L (hereinafter denoted by sign L6 as needed) which is used as a taillight (tail lamp) or a stop light (also called a brake light or a brake lamp) by changing the intensity, a light source L3 which is used as a width indicator, and a light source L4 which is used as a blinker. As the light sources L5 and L6, for example, incandescent lamps (incandescent bulbs) such as halogen lamps are used. Further, the above-described light sources L3 to L6 of the rear lamp unit 140 are also lit and extinguished by the relay/fuse box 200.

In recent years, there has been widespread introduction of electronics into vehicles. Vehicles are equipped with various control systems for improving driving safety. For example, vehicles are equipped with control systems for implementing systems such as ARS (Advanced Rearlighting System) with which an emergency braking in an emergency causes brake lamps to flash to inform a following vehicle of the status of a vehicle in more detail, and AFS (Adaptive Frontlighting System) which greatly improves visibility for a driver during night driving by emitting light in the direction of gaze or the turn direction of a vehicle at the time of cornering (e.g., see Patent Documents 1 and 2).

The implementation of AFS requires loads for changing the orientation and the like of light sources in accordance with the environment of the vehicle. For example, in the vehicle 100 shown in FIG. 1, a swivel motor M1 for turning the optical axis of the light source L1 to the right and left, and a leveling motor M2 for adjusting the vertical position of the optical axis of the light source L1 are provided as loads for changing the orientation and the like of light sources in accordance with the environment of the vehicle. Moreover, in the vehicle 100, a motor controller 150 is provided for use in the control of operation of the swivel motor M1 and the leveling motor M2.

The motor controller 150 is connected to the transmission lines N of the in-vehicle network as is similar to the relay control unit. Based on vehicle information and the like received through these transmission lines N, the motor controller 150 controls the swivel motor M1 and the leveling motor M2. For example, when the vehicle 100 passes through a curve, the motor controller 150 controls the swivel motor M1 to turn the optical axis of the light source L1 so that the light source L1 may emit light in the travelling direction of the vehicle 100. Moreover, the motor controller 150 also controls the leveling motor M2 so that the position of the light source L1 may be kept constant with respect to the road surface even when there is a change in road surface conditions or the number of passengers.

Since operating power for the above-described motor controller 150 is also supplied from the vehicle-mounted battery, the supply of power from the battery to the motor controller 150 are started and stopped by the relay/fuse box 200. For these functions, the relay/fuse box 200 is further provided with relays RY5 and RY6 individually interposed between the motor controller 150 and the power line S2, and a relay RY7 interposed between the motor controller 150 and the power line S3, in addition to the above-described relays RY1 to RY4 and fuses H1 to H4. The relay/fuse box 200 further includes a fuse H5 interposed between the relay RY5 and the power line S2, a fuse H6 interposed between the relay RY6 and the power line S2, a fuse H7 interposed between the relay RY7 and the power line S3, and a fuse H8 interposed between the motor controller 140 and the power line S1. Moreover, the above-described relay control unit also has the function of performing switching control on the relays RY5 to RY7 on the basis of vehicle information and the like received through the transmission lines N of the in-vehicle network.

Patent Document 1: JP-A 2006-7987
Patent Document 2: JP-A 2006-7988

As described above, in recent years, vehicles have been increasingly provided with loads (e.g., a swivel motor, a leveling motor, an acceleration sensor, a solenoid for changing the light emission direction of the headlight, and the like) which are used in various control systems such as the aforementioned ARS and AFS. In some cases, from a safety standpoint, there are provided a light source (cornering lamp) for cornering which is used to improve visibility in turning by emitting light in the direction of inner wheels at the time of turning, a light source (daytime running lamp) for daytime lighting with which a vehicle makes its presence known to other vehicles even in the daytime to prevent an accident, and the like. Overall, the number of light sources provided in a vehicle is on the increase. Further, there have been an increasing number of cases where LEDs are used as light sources for headlights, taillights, and the like.

Operating electric power for each of loads such as described above is supplied from a vehicle-mounted battery. To supply power from the vehicle-mounted battery to a load, a fuse needs to be arranged in the power supply path therebetween for safety assurance. Accordingly, as the number of loads installed in a vehicle increases, the numbers of fuses and relays which must be provided in the relay/fuse box 200 also increases. As a result, there have arisen problems such as the increase in the size and cost of the relay/fuse box 200. In particular, in the case where the size of the relay/fuse box 200 increases, it becomes difficult to install the relay/fuse box 200 at the conventional installation position. This may cause various harmful effects such as a significant design change.

One conceivable approach for decreasing the size of the relay/fuse box 200 is, for example, to decrease the total number of fuses by using a single fuse for multiple loads for different uses. For example, it is conceivable that the light sources L2 to L4 are collectively connected to the fuse H2, unlike in FIG. 1 in which the fuses H2 to H4 are connected to the light sources L2 to L4, respectively. This makes it possible to omit the fuses H3 and H4.

However, when a short-circuit occurs in any one of the light sources L2 to L4, e.g., the light source L3, to cause a blowout of the fuse H2, the light sources L2 and L4 without abnormalities also become unusable. In other words, there arises the problem that multiple loads simultaneously become unusable when a fuse is blown. This becomes a big problem, particularly in the case where the multiple loads have different uses, respectively. In the aforementioned example, in the event of a short-circuit in the light source L3 for the width indicator, the light source L2 also becomes unusable which is the headlight more important than the width indicator. Accordingly, when consideration is given to safety, it is not favorable to collectively connect multiple loads (in particular, multiple loads for different uses) to a single fuse as described above.

The present invention has been made in view of the above-described points, and an object of the present invention is to provide a vehicle-mounted load controller, a vehicle-mounted headlight device, and a vehicle-mounted taillight device which enable the miniaturization of a relay/fuse box and which make it possible to prevent multiple loads from simultaneously becoming unusable.

DISCLOSURE OF INVENTION

To solve the above-mentioned problems, the present invention is characterized by comprising: one or more power terminals connected to one or more power lines of a vehicle-mounted DC power supply through a fuse, respectively; a plurality of load connecting portions connected to a plurality of vehicle-mounted loads, respectively; switches configured to correspond to the plurality of load connecting portions, respectively, each of the switches starting and stopping supply of power from the power line connected to one of the one or more power terminals to a load connected to the corresponding load connecting portion; and a control unit configured to control the switches in response to inputted control signals, characterized in that two or more of the plurality of load connecting portions are electrically connected to at least one of the one or more power terminals, and each of the switches stops the supply of power from the power line to the load connected to the corresponding load connecting portion when magnitude of current flowing through the load connected to the corresponding load connecting portion reaches or exceeds a predetermined value.

BRIEF DESCRIPTION OF DRAWINGS

FIG. 5 is an explanatory diagram of a switch in the vehicle-mounted load controller.

BEST MODE FOR CARRYING OUT THE INVENTION

First Embodiment

Figure 3:
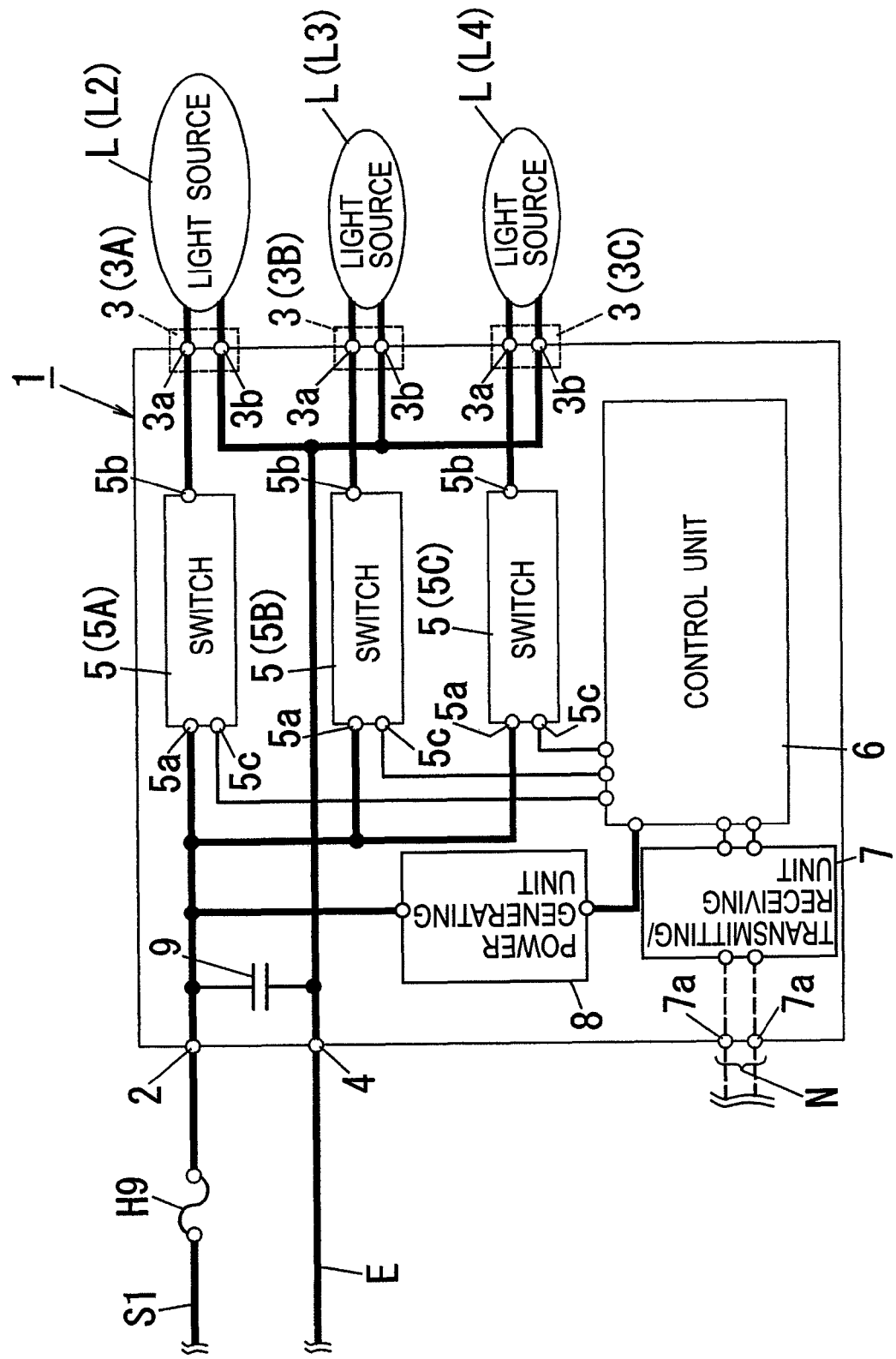
FIG. 3 is a schematic explanatory diagram of a vehicle-mounted load controller of a first embodiment.
Figure 4:
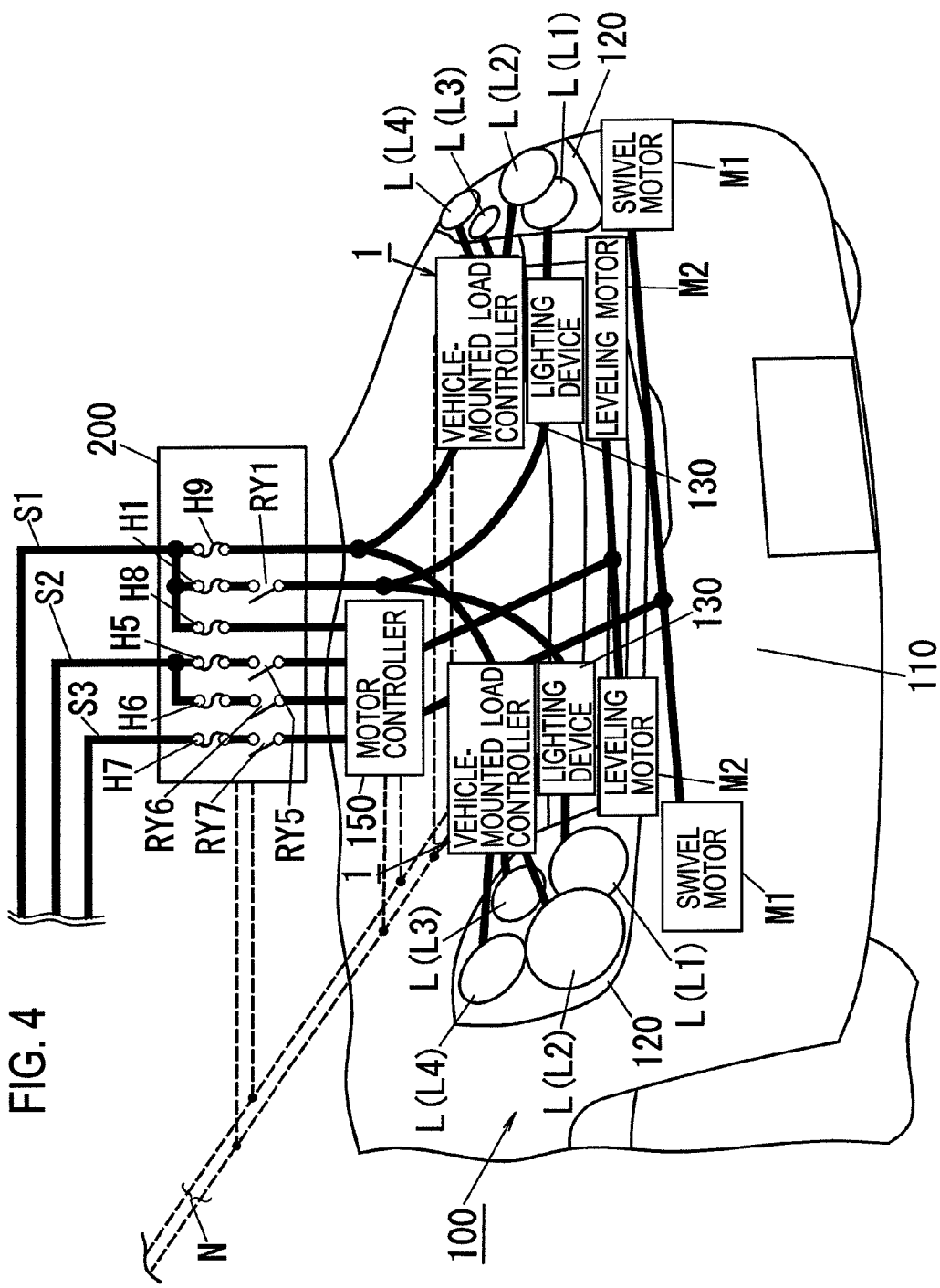
FIG. 4 is an explanatory diagram showing an example of use of the vehicle-mounted load controller.

A vehicle-mounted load controller 1 of this embodiment is used as a vehicle-mounted light source controller for controlling the lighting of multiple loads including light sources L (L2 to L4) provided in a front lamp unit 120 which is a vehicle-mounted lamp fitting of a vehicle 100 as shown in FIG. 4. The vehicle-mounted load controller 1, together with the front lamp unit 120, constitutes a vehicle-mounted headlight device. It should be noted that the vehicle-mounted headlight device includes the light source L3 for a width indicator and the light source L4 for a blinker in addition to the light source L2 for a headlight, and is also used for purposes other than a headlight. However, in this embodiment, such a device is referred to as a vehicle-mounted headlight device as long as the device includes the light source L2 for a headlight. Moreover, components of the vehicle 100 which are shown in FIG. 3 and similar to those of the conventional example will be denoted by the same signs, and a description thereof will be omitted.

Figure 7:
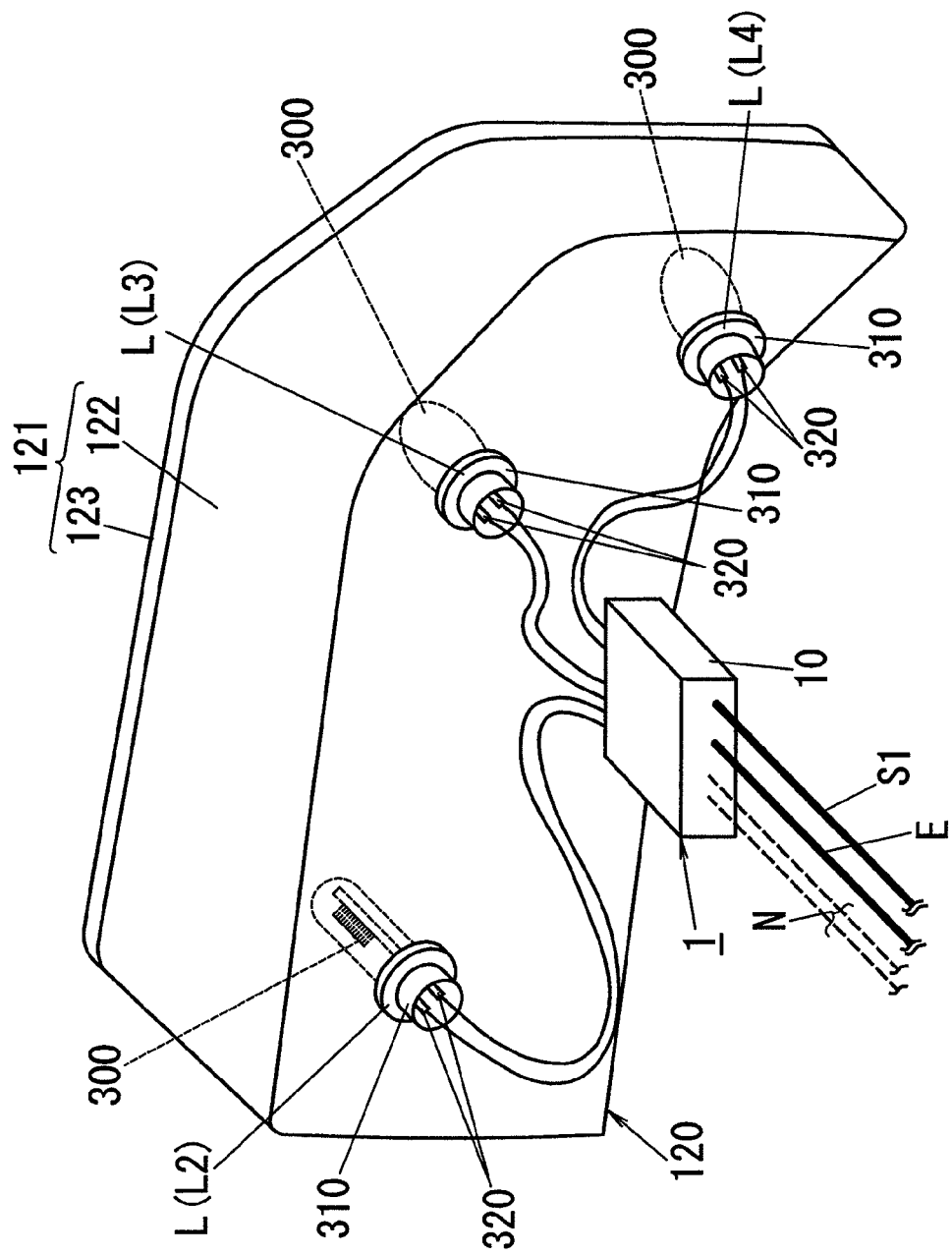
FIG. 7 is a perspective view of a vehicle-mounted headlight device including the vehicle-mounted load controller.

As shown in FIG. 7, the front lamp unit 120 includes a box-shaped lamp casing 121 installed in a front face of the vehicle, multiple light sources L1 to L4 attached to the lamp casing 121, and a swivel motor M1 and a leveling motor M2 attached to the lamp casing 121. It should be noted that in FIG. 7, the light source L1, the swivel motor M1, and the leveling motor M2 are not shown which are not loads to be controlled by the vehicle-mounted load controller 1 of this embodiment.

The light sources L2 to L4 are incandescent lamps such as halogen lamps, and each include a light-emitting portion (bulb) 300, a base 310, and a pair of power supply terminal portions 320. The light-emitting portion 300 is formed of a glass tube in which a filament is enclosed. The base 310 is provided on the base side of the light-emitting portion 300. The pair of power supply terminal portions 320 is provided on the opposite side of the base 310 from the light emitting portion 300 in a protruding manner to apply a voltage between the two ends of the filament in the light-emitting portion 300. It should be noted that the light source L1 is a high-intensity discharge lamp, and includes a light-emitting portion (bulb) 300, a base 310, and a pair of power supply terminal portions 320. The light-emitting portion 300 includes a glass tube in which a pair of electrodes is enclosed. The base 310 is provided on the base side of the light-emitting portion 300. The pair of power supply terminal portions 320 is provided on the opposite side of the base 310 from the light emitting portion 300 in a protruding manner to apply potentials to the pair of electrodes, respectively.

The lamp casing 121 includes, for example, a housing 122 and a translucent cover 123. The housing 122 is formed from insulating resin material in the shape of a box having an open end on one side (side located on the front face side of a vehicle body 110 in the state of being installed in the vehicle body 110). The translucent cover 123 is made of translucent resin material and attached to the housing 122 in such a way that the translucent cover 123 covers the open end of the housing 122. On the side (rear face side) of the other end of the housing 122, open-hole portions (not shown) are formed through which the light-emitting portions 300 of the light sources L are inserted into the lamp casing 121. The light sources L are attached to the lamp casing 121 in such a way that the light-emitting portions 300 are located inside the lamp casing 121 and that the bases 310 (power supply terminal portions 320) are located outside the lamp casing 121. It should be noted that waterproofing is applied between the housing 122 and the translucent cover 123 and between the open-hole portions of the housing 122 and the light sources L.

As shown in FIG. 3, the vehicle-mounted load controller 1 of this embodiment includes a power terminal 2, multiple (three in the shown example) load connecting portions 3, a grounding terminal 4, switches 5, a control unit 6, a transmitting/receiving unit 7, a power generating unit 8, a smoothing circuit 9. The power terminal 2 is connected to a power line S1 of a vehicle-mounted battery through a fuse H9 of a relay/fuse box 200. To the multiple load connecting portions 3, the multiple (three in the shown example) vehicle-mounted light sources L2 to L4 are connected, respectively. To the grounding terminal 4, a grounding line E is connected which is connected to an unillustrated lower-potential terminal (negative terminal) of the battery. The switches 5 are provided to correspond to the load connecting portions 3, respectively, and start and stop supplies of power from the power line S1 connected to the power terminal 2 to the light sources L connected to the load connecting portions 3. The control unit 6 controls the switches 5 in response to inputted control signals. The transmitting/receiving unit 7 includes a transceiver for an in-vehicle network. The power generating unit 8 supplies power to the control unit 6. The smoothing circuit 9 is connected between the power terminal 2 and the grounding terminal 4.

It should be noted that in the following description, for the sake of distinction of the multiple load connecting portions 3 from each other, the load connecting portion 3 to which the light source L2 is connected is denoted by sign 3A, the load connecting portion 3 to which the light source L3 is connected is denoted by sign 3B, and the load connecting portion 3 to which the light source L4 is connected is denoted by sign 3C, as needed. Moreover, for the sake of distinction of the switches 5 from each other, the switch 5 corresponding to the load connecting portion 3A is denoted by sign 5A, the switch 5 corresponding to the load connecting portion 3B is denoted by sign 5B, and the switch 5 corresponding to the load connecting portion 3C is denoted by sign 5C, as needed.

Each of the load connecting portions 3 includes a higher-potential connecting terminal 3a electrically connected to the power terminal 2 and a lower-potential connecting terminal 3b electrically connected to the grounding terminal 4. The connecting terminals 3a and 3b are connected to the pair of power supply terminal portions 320 of the light source L, respectively. Thus, current is supplied to the filament of the light source L. The connecting terminals 3a of the multiple load connecting portions 3 are connected to the same power terminal 2 as shown in FIG. 3. In other words, the multiple load connecting portions 3 to which the multiple light sources L2 to L4 for different uses are respectively connected are electrically connected to one power terminal 2.

The switches 5 are arranged between the power terminal 2 and the load connecting portions 3. As shown in part (a) of FIG. 5, each of the switches 5 includes an input terminal 5a, an output terminal 5b, and a control terminal 5c. The input terminal 5a is connected to the power terminal 2. The output terminal 5b is connected to the higher-potential connecting terminal 3a of the load connecting portion 3. The control terminal 5c receives a switching control signal from the control unit 6. Between the input terminal 5a and the output terminal 5b, a series circuit is inserted which includes a semiconductor switch element 50, such as a MOSFET, and a current detecting resistor 51. The semiconductor switch element 50 is disposed between the power source and the load to serve as a high-side switch. The current detecting resistor 51 is intended to detect the current flowing through the light source L connected to the corresponding load connecting portion 3.

Moreover, the switch 5 includes a switching control unit 52 for performing the on-off control of the semiconductor switch element 50. The switching control unit 52 is electrically connected to the control terminal 5c. The switching control unit 52 receives a switching control signal from the control unit 6 through the control terminal 5c, and switches the semiconductor switch element 50 between on and off states on the basis of the switching control signal received from the control unit 6. Further, when the semiconductor switch element 50 is on, the switching control unit 52 detects the current flowing through the light source L on the basis of the output of a differential amplifier 53 for amplifying the voltage between the two ends of the current detecting resistor 51 and on the ohmic value of the current detecting resistor 51. When the magnitude of the current reaches or exceeds a predetermined value, the switching control unit 52 assumes that a failure such as a short-circuit has occurred in the light source L, and turns off the semiconductor switch element 50 to stop the supply of power from the power line S1 to the light source L. Accordingly, excessive current can be prevented from flowing through the power line S1. This prevents a blowout of the fuse H9 arranged between the power terminal 2 and the power line S1. It should be noted that the predetermined value is not necessarily the same for all the light sources L and is appropriately set in accordance with the types of the light sources L. Moreover, these switches 5 are connected to the grounding terminal 4, and use the grounding line E as a ground, though not shown. In this regard, the control unit 6 is the same.

The control unit 6 includes, for example, a microcomputer or the like, and is connected to transmission lines N of the in-vehicle network through the transmitting/receiving unit 7 and also to the respective control terminals 5c of the switches 5. Moreover, to the control unit 6, the power generating unit 8 is connected so that the electric power needed for the operation of the control unit 6 may be supplied from the power generating unit 8. The power generating unit 8 is connected to the power terminal 2, and generates operating power for the control unit 6 from the electric power obtained from the power line S1 through the power terminal 2 to supply the operating power to the control unit 6. It should be noted that, as the above-described power generating unit 8, a conventionally known one can be employed, and therefore a description thereof will be omitted.

The transmitting/receiving unit 7 includes a pair of transmission line connecting terminals 7a to which the transmission lines N of the in-vehicle network are respectively connected. The transmitting/receiving unit 7 receives vehicle information which the control unit 6 needs among the vehicle information flowing through the in-vehicle network, and outputs the needed vehicle information to the control unit 6. The control unit 6 outputs switching control signals to the switches 5 on the basis of the vehicle information inputted from the transmitting/receiving unit 7, respectively. The vehicle information which the control unit 6 needs includes, for example, a control signal (on or off signal for the light source L2) for turning on or off a driving beam, a control signal (on or off signal for the light source L3) for turning on or off the width indicator, and a control signal (on or off signal for the light source L4) for turning on or off the blinker. The control unit 6 outputs a switching control signal for on to the switch 5A upon receiving an on signal for the light source L2 through the transmitting/receiving unit 7, and outputs a switching control signal for off to the switch 5A upon receiving an off signal for the light source L2. Similarly, the control unit 6 outputs a switching control signal for on to the switch 5B upon receiving an on signal for the light source L3, outputs a switching control signal for off to the switch 5B upon receiving an off signal for the light source L3, outputs a switching control signal for on to the switch 5C upon receiving an on signal for the light source L4, and outputs a switching control signal for off to the switch 5C upon receiving an off signal for the light source L4.

Here, the operation of the vehicle-mounted load controller 1 upon receiving an on or off signal for each of the light sources L will be described with reference to FIG. 6. For example, as shown in part (a) of FIG. 6, upon receiving an on signal (high-level signal) for the light source L2 through the transmitting/receiving unit 7 at time T1, the control unit 6 outputs a switching control signal for on to the switch 5A. The switching control unit 52 of the switch 5A turns on the semiconductor switch element 50. This causes current to be supplied to the light source L2 as shown in part (d) of FIG. 6, and the light source L2 is lit (driving beam is emitted). This is continued until an off signal (low-level signal) is received at time T3. In part (a) of FIG. 6, an example is shown in which an on signal is inputted to the control unit 6 at time T4 after time T3, an off signal is inputted thereto at time T6 after that, an on signal is inputted thereto at time T8 after that, and an off signal is inputted thereto at time T9 after that. In this case, as shown in part (d) of FIG. 6, only during the period from time T4 to time T6 and the period from time T8 to time T9, current is supplied to the light source L2, and the light source L2 is lit.

Figure 6:
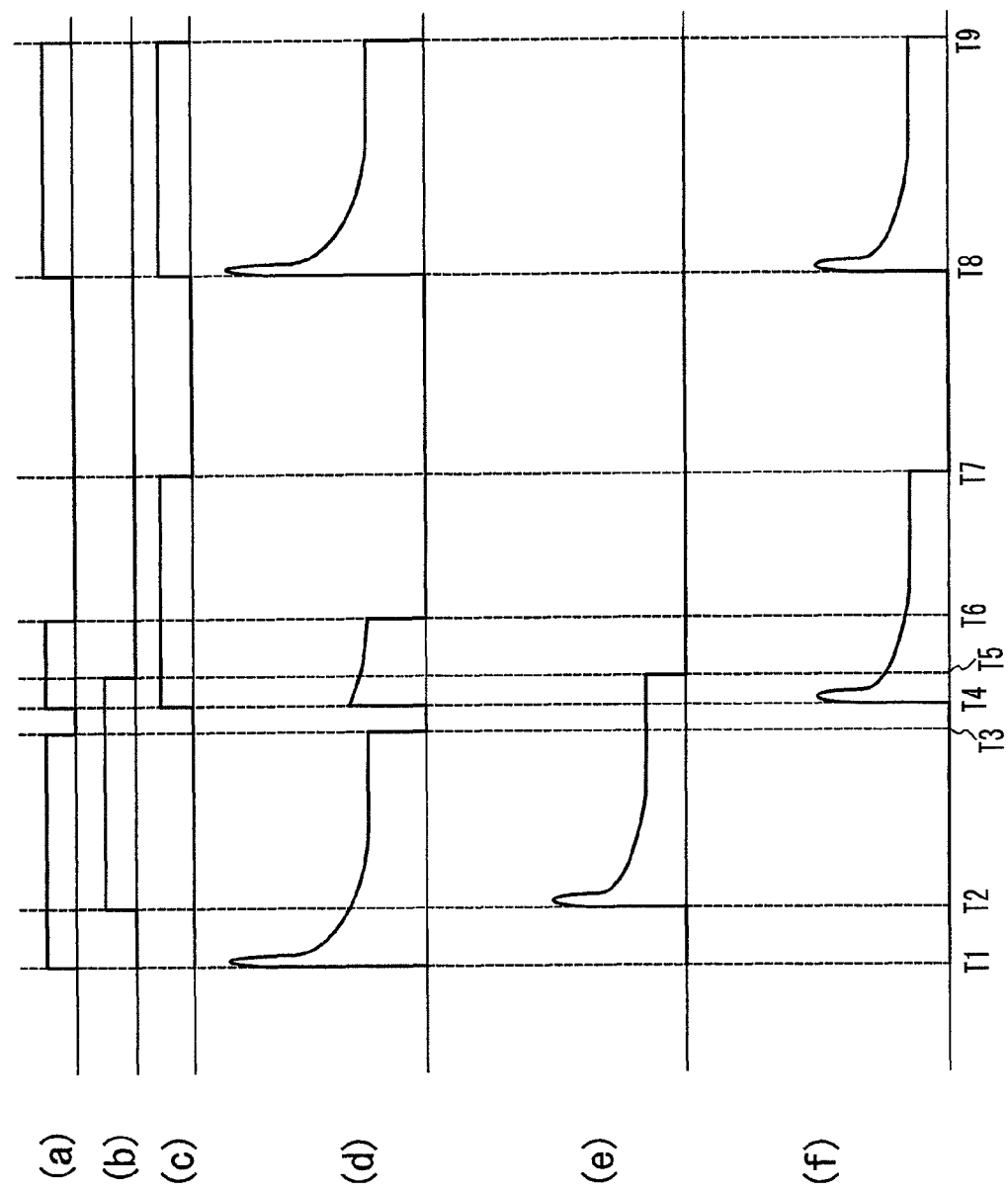
FIG. 6 is a timing chart showing the operation of the vehicle-mounted load controller.

As shown in part (b) of FIG. 6, upon receiving an on signal (high-level signal) for the light source L3 through the transmitting/receiving unit 7 at time T2, the control unit 6 outputs a switching control signal for on to the switch 5B. The switching control unit 52 of the switch 5B turns on the semiconductor switch element 50. This causes current to be supplied to the light source L3 as shown in part (e) of FIG. 6, and the light source L3 is lit (width indicator is lit). This is continued until an off signal (low-level signal) is received at time T3.

Figure 10:
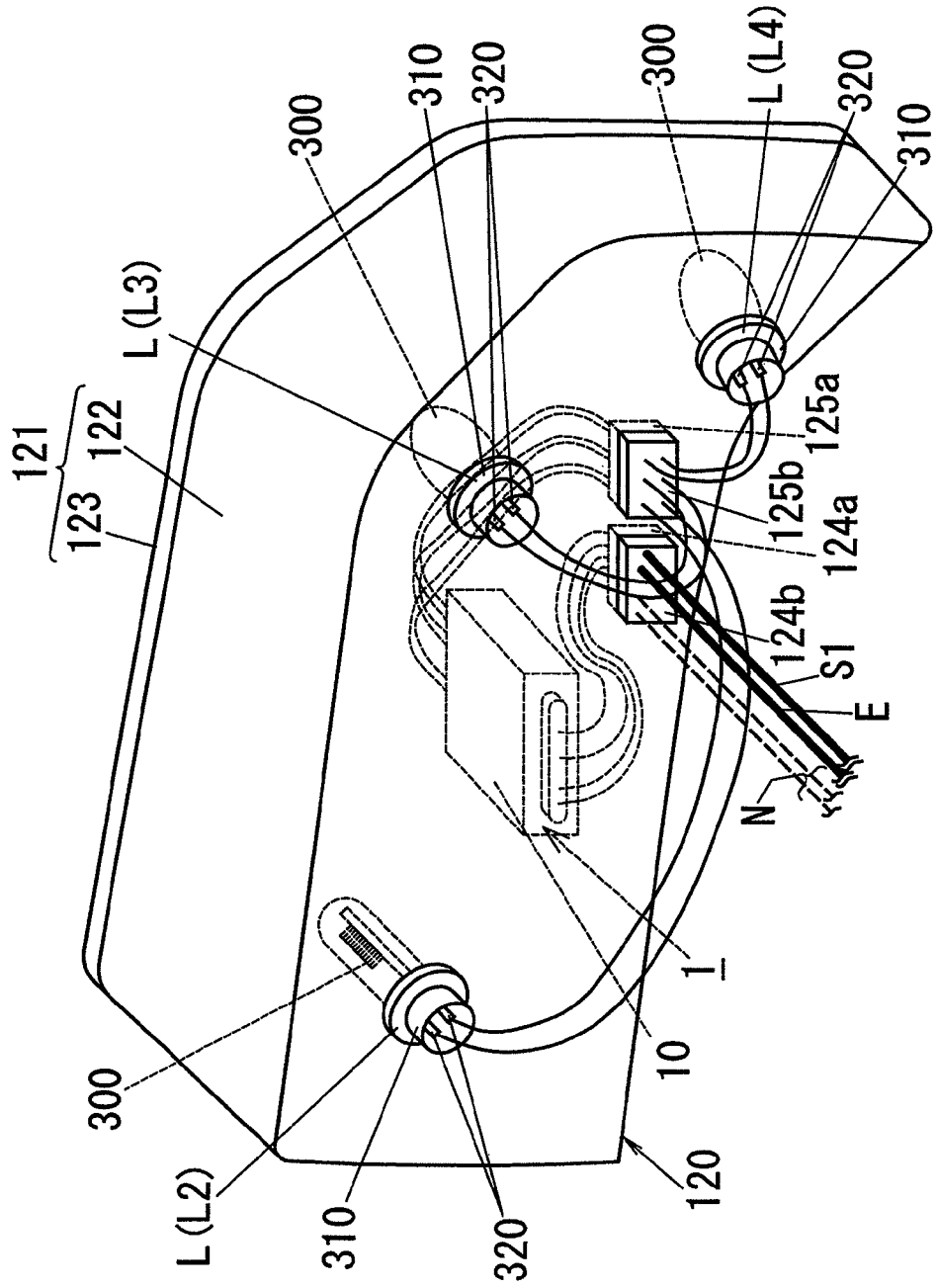
FIG. 10 is a perspective view of another example of the vehicle-mounted headlight device including the vehicle-mounted load controller.
Figure 11:
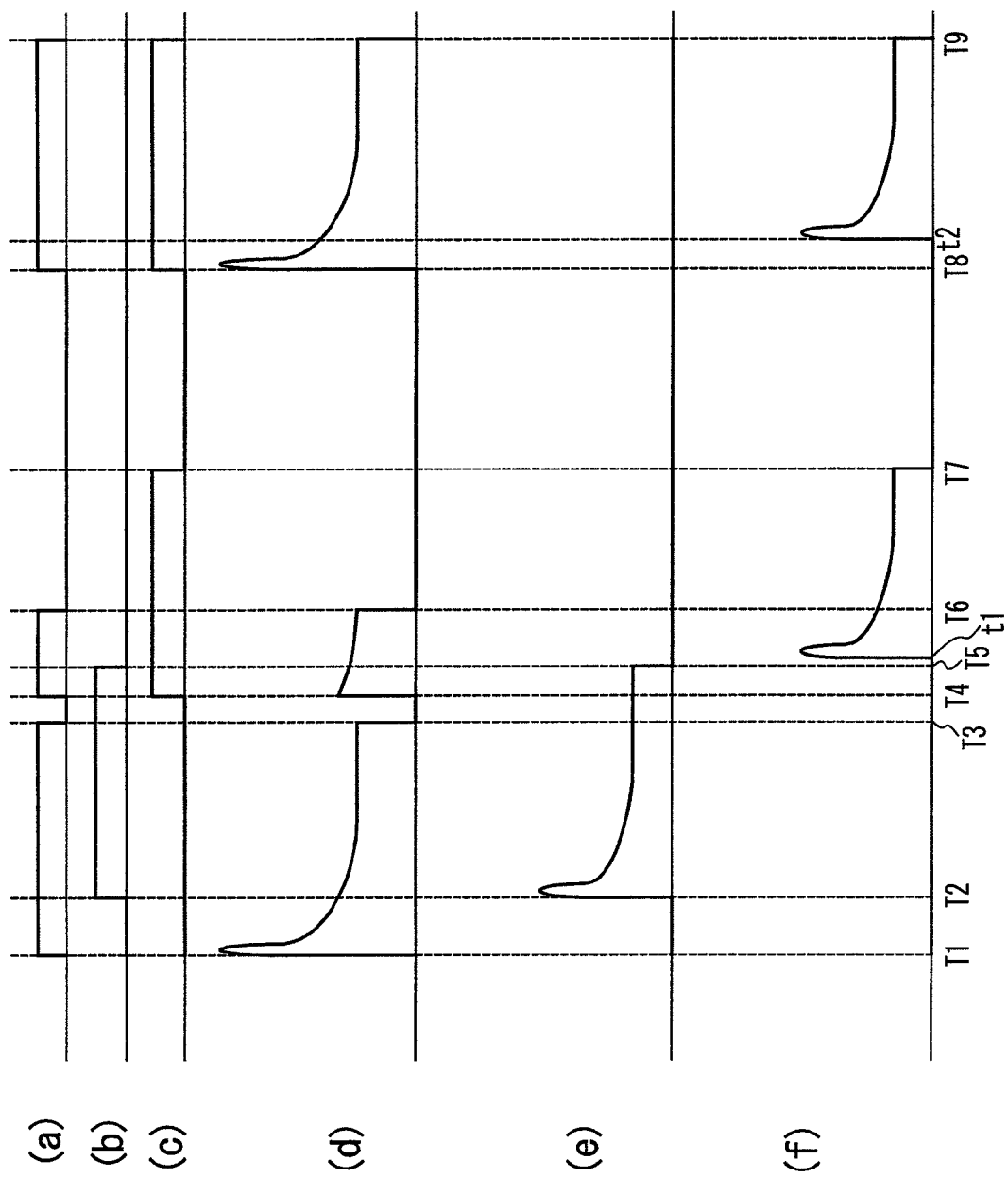
FIG. 11 is a timing chart showing the operation of a vehicle-mounted load controller of a second embodiment.
Figure 17:
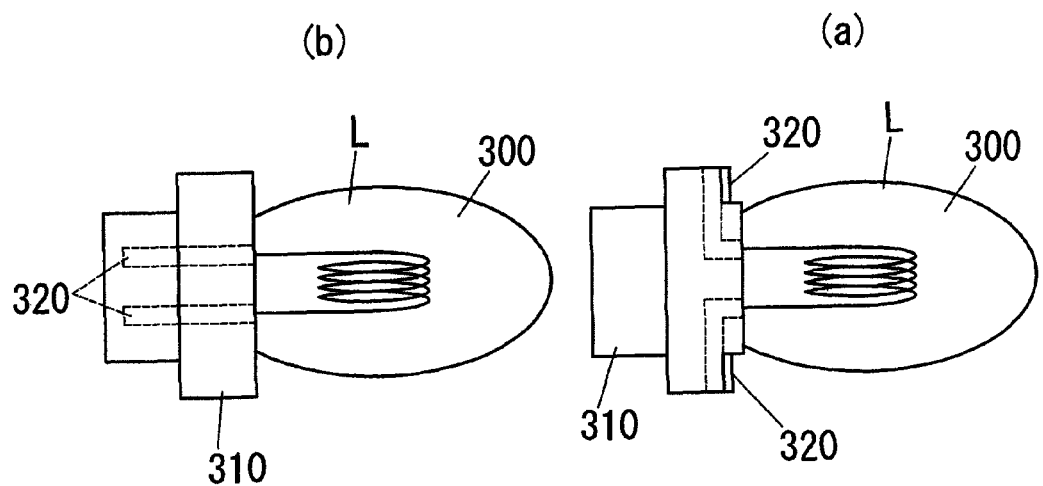
FIG. 17 part (a) is a schematic explanatory diagram of a light source in the vehicle-mounted headlight device, and part (b) is a schematic explanatory diagram of a light source of a comparative example.

Further, as shown in part (c) of FIG. 6, upon receiving an on signal (high-level signal) for the light source L4 through the transmitting/receiving unit 7 at time T4, the control unit 6 outputs a switching control signal for on to the switch 5C. The switching control unit 52 of the switch 5C turns on the semiconductor switch element 50. This causes current to be supplied to the light source L4 as shown in part (d) of FIG. 6, and the light source L4 is lit (blinker is lit). This is continued until an off signal (low-level signal) is received at time T7. In part (c) of FIG. 6, an example is shown in which an on signal is inputted to the control unit 6 at time T8 after time T7, and an off signal is inputted thereto at time T9 after that. In this case, as shown in part (f) of FIG. 6, only during the period from time T8 to time T9, current is supplied to the light source L4, and the light source L4 is lit. It should be noted that in a CAN network, a control signal to light or extinguish a light source L is transmitted in a constant cycle (e.g., a cycle of several milliseconds to several hundred milliseconds). Accordingly, an on signal for each light source L is not exactly a continuous signal such as shown in part (a) to (c) of FIG. 6. However, for the purpose of simplicity of illustration, an on signal for each light source L is shown as a continuous signal in part (a) to (c) of FIG. 6. In this regard, FIGS. 11, 10, and 17 are the same.

The smoothing circuit 9 includes a smoothing capacitor (e.g., electric field capacitor or ceramic capacitor). The higher-potential side of the smoothing circuit 9 is connected to the input terminals 5a of the switches 5, and the lower-potential side thereof is connected to the lower-potential connecting terminals 3b of the load connecting portions 3. In other words, the smoothing capacitor is connected in parallel with series circuits each including the light source L connected to a load connecting portion 3 and the switch 5 corresponding to the load connecting portion 3. Accordingly, the above-described smoothing circuit 9 smoothes the voltage between the two ends of each of the series circuits and the potential at the power terminal 2 (potential of the power line S1). The capacitance of the smoothing capacitor included in the above-described smoothing circuit 9 is set to be capable of accumulating a charge large enough to prevent the potential at the power terminal 2 from fluctuating due to, for example, inrush current (see part (d) and (f) of FIG. 6 to 6) occurring when the filaments of the light sources L2 to L4 are not sufficiently warmed.

Moreover, as shown in FIG. 7, the vehicle-mounted load controller 1 includes an enclosure 10 which contains the power terminal 2, the load connecting portions 3, the grounding terminal 4, the switches 5, the control unit 6, the transmitting/receiving unit 7, the power generating unit 8, and the smoothing circuit 9. The enclosure 10 of the vehicle-mounted load controller 1 is disposed in such a way that the enclosure 10 is closer to the front lamp unit 120 than the relay/fuse box 200, e.g., the enclosure 10 is adjacent to the rear surface of the lamp casing 121 of the front lamp unit 120. As shown in FIGS. 4 and 7, the enclosure 10 of the vehicle-mounted load controller 1 is used with the power terminal 2 connected to the power line S1 through the fuse H9 (not shown in FIG. 7), with the grounding terminal 4 connected to the grounding line E, with the transmission line connecting terminals 7a connected to the transmission lines N of the in-vehicle network, and with the light sources L2 to L4 connected to the respective load connecting portions 3A to 3C. It should be noted that though the enclosure 10 is disposed adjacent to the rear surface of the lamp casing 121 in the example shown in FIG. 7, this is not intended to limit the disposed position of the enclosure 10 to a position adjacent to the rear surface of the lamp casing 121. The disposed position of the enclosure 10 may also be a position adjacent to the upper or lower surface of the lamp casing 121.

Figure 1:
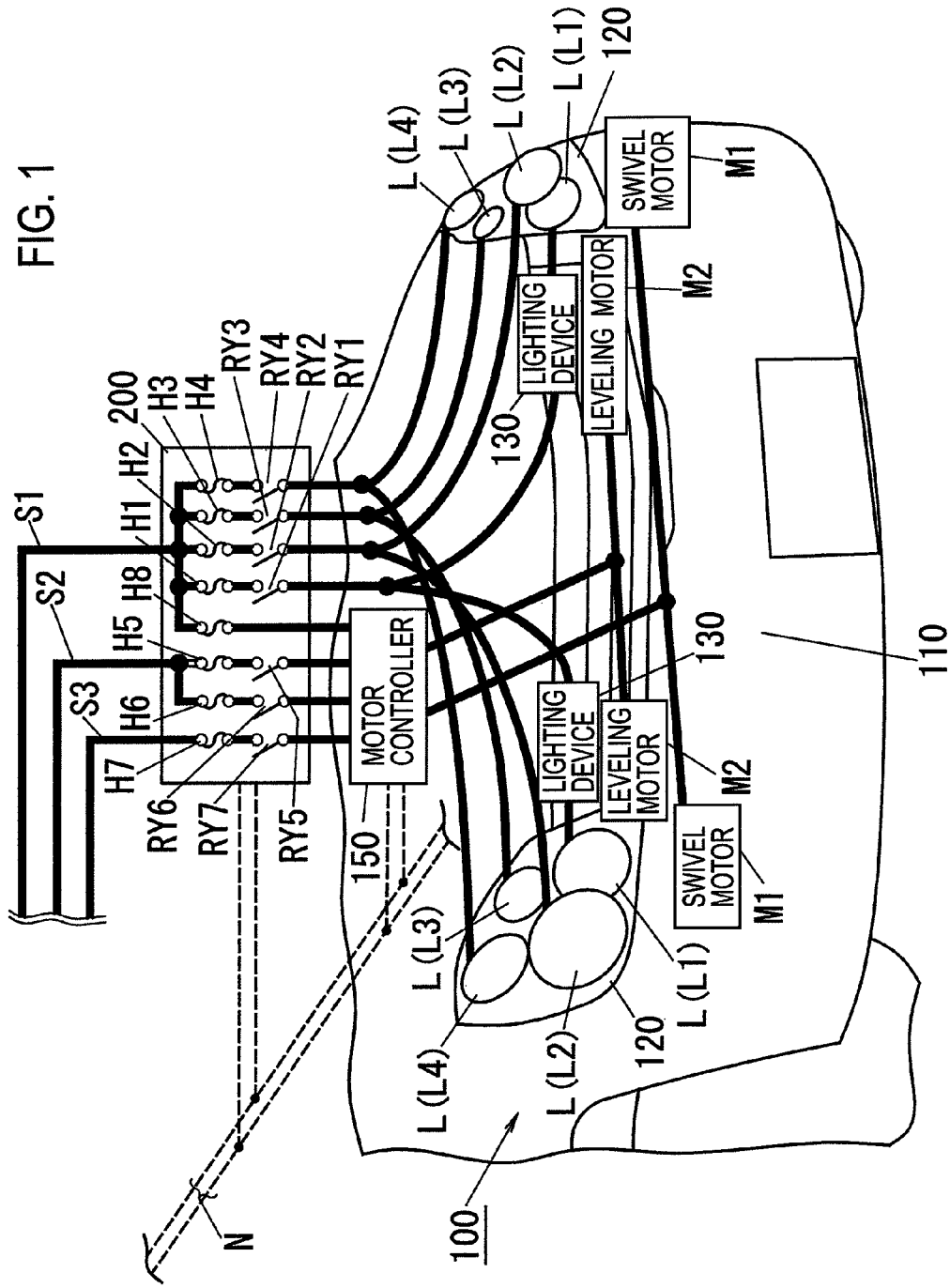
FIG. 1 is a schematic explanatory diagram of a vehicle of a conventional example.

In the above-described vehicle-mounted load controller 1 of this embodiment, the multiple load connecting portions 3 for the multiple light sources L2 to L4 for different uses are connected to one power terminal 2 connected to the power line S1 of the vehicle-mounted battery through the fuse H9. Accordingly, unlike in the conventional example shown in FIG. 1, it is unnecessary to connect the multiple light sources L2 to L4 for different uses to the power line S1 through the fuses H2 to H4, respectively. This enables the miniaturization and cost reduction of the relay/fuse box 200. Accordingly, there is no difficulty in disposing the relay/fuse box 200. Further, the entire size of the vehicle 100 can be made smaller than heretofore. Thus, for example, it becomes possible to provide a vehicle having improved riding comfort by increasing the cabin space of the vehicle 100.

In addition, when the magnitude of the current flowing through a light source L reaches or exceeds a predetermined value, the switch 5 stops the supply of power from the power line S1 to the light source L. This can prevent a blowout of the fuse H9 between the power terminal 2 and the power line S1. Accordingly, it is possible to prevent a blowout of the fuse H9 from simultaneously stopping supplies of power to the light sources L2 to L4 connected to the multiple load connecting portions 3A to 3C connected to the power terminal 2, and therefore to prevent multiple loads (in this embodiment, the multiple light sources L2 to L4 for different uses) from simultaneously becoming unusable. Moreover, the provision of the load connecting portion 3A to which the light source L2 for the headlight is connected makes it possible to light and extinguish the headlight.

The vehicle-mounted headlight device in this embodiment is configured of: the front lamp unit 120 which is a vehicle-mounted lamp fitting including the box-shaped lamp casing 121 installed in a front face of the vehicle body 110 of the vehicle 100 and multiple loads (light sources L2 to L4)

including at least the light source L2 for the headlight attached to the lamp casing 121; and the vehicle-mounted load controller 1 of this embodiment which serves as a headlight controller. This enables the miniaturization and cost reduction of the relay/fuse box, and makes it possible to prevent multiple light sources L from simultaneously becoming unusable. It should be noted that though the load connecting portions 3 are connected one-to-one to the light sources L as loads in this embodiment, multiple loads for the same use may be connected to one load connecting portion 3. Settings can be appropriately made in accordance with the number, types, and uses of loads to be controlled by the vehicle-mounted load controller 1.

In the vehicle-mounted load controller 1 of this embodiment, the smoothing circuit 9 is connected in parallel with the series circuits each including the light source L connected to a load connecting portion 3 and the switch 5 corresponding to the load connecting portion 3, the smoothing circuit 9 including the smoothing capacitor for smoothing the voltage between the two ends of each of the series circuits. This can reduce the fluctuation of the potential (i.e., the potential of the power line S1 connected to the power terminal 2) at the power terminal 2 due to the lighting or extinction of the light sources L, and can reduce the influence of the noise (normal mode noise) occurring in the power supply paths to the light sources L on the switches 5 and the light sources L. Moreover, the vehicle-mounted load controller 1 of this embodiment is disposed to be close to the front lamp unit 120 as described previously. This makes current loops for the current flowing through the light sources L shorter than in the conventional example shown in FIG. 1. Thus, the noise can be further reduced. It should be noted that the smoothing circuit 9 is not limited to one including only the smoothing capacitor. For example, an inductor may be inserted between the higher-potential side of the smoothing capacitor and the power terminal 2, or the smoothing circuit may be a noise filter such as a pi filter.

In the switch 5 shown in part (a) of FIG. 5, the switching control unit 5 receives the output of the differential amplifier 53 to determine whether or not the magnitude of the current flowing through the light source L reaches or exceeds a predetermined value, and, if the magnitude reaches or exceeds the predetermined value, turns off the semiconductor switch element 50. However, such a determination as to whether or not the magnitude of the current flowing through the light source L reaches or exceeds the predetermined value may be made by the control unit 6. In this case, as shown in part (b) of FIG. 5, a sensing terminal 5d is provided in the switch 5 to extract the output of the differential amplifier 53. This sensing terminal 5d is connected to the control unit 6. The control unit 6 is preferably provided with the function of determining the magnitude of the current flowing through the light source L on the basis of the output of the differential amplifier 53 and the ohmic value of the current detecting resistor 51, and, when the magnitude of the current reaches or exceeds the predetermined value, outputting a switching control signal for off to the switch 5 in which the magnitude of the current reaches or exceeds the predetermined value. With the above-described switch 5 shown in part (b) of FIG. 5, similar effects can be obtained as in the example shown in part (a) of FIG. 5.

Figure 8:
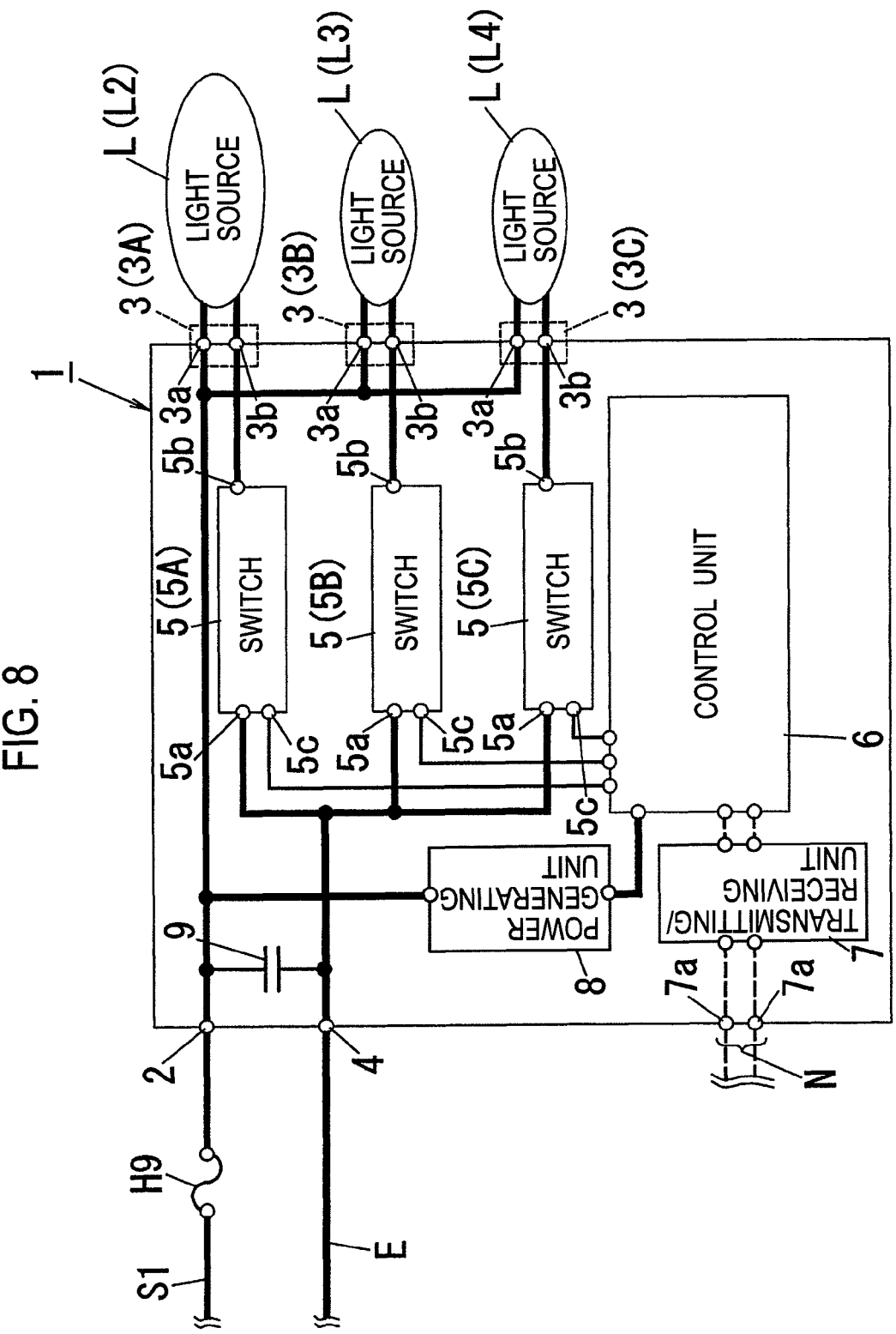
FIG. 8 is a schematic explanatory diagram of another example of the vehicle-mounted load controller.

Moreover, in the vehicle-mounted load controller 1 shown in FIG. 3, the switches 5 are arranged between the higher-potential connecting terminals 3a of the load connecting portions 3 and the power terminal 2. However, as shown in FIG. 8, the switches 5 may be arranged between the lower-potential connecting terminals 3b of the load connecting portions 3 and the grounding terminal 4. In short, the switches 5 only need to be provided so that the supply of power from the power line S1 to the light sources L can be started and stopped using the semiconductor switch elements 50 of the switches 5. It should be noted that in the example shown in FIG. 8, the semiconductor switch elements 50 of the switches 5 are used as low-side switches connected between the loads and the ground. Other components of each of the switches 5 are similar to those in the example shown in FIG. 3, and therefore a description thereof will be omitted. Alternatively, the current detecting resistor 51 may be provided separately from the switch 5 rather than provided integrally with the switch 5. A method of detecting current is also not limited to a method using the current detecting resistor 51, and other various heretofore known methods can be used. Moreover, the configurations of the switch 5 shown in FIGS. 5 and 8 can also be employed in second to sixth embodiments described later.

Figure 9:
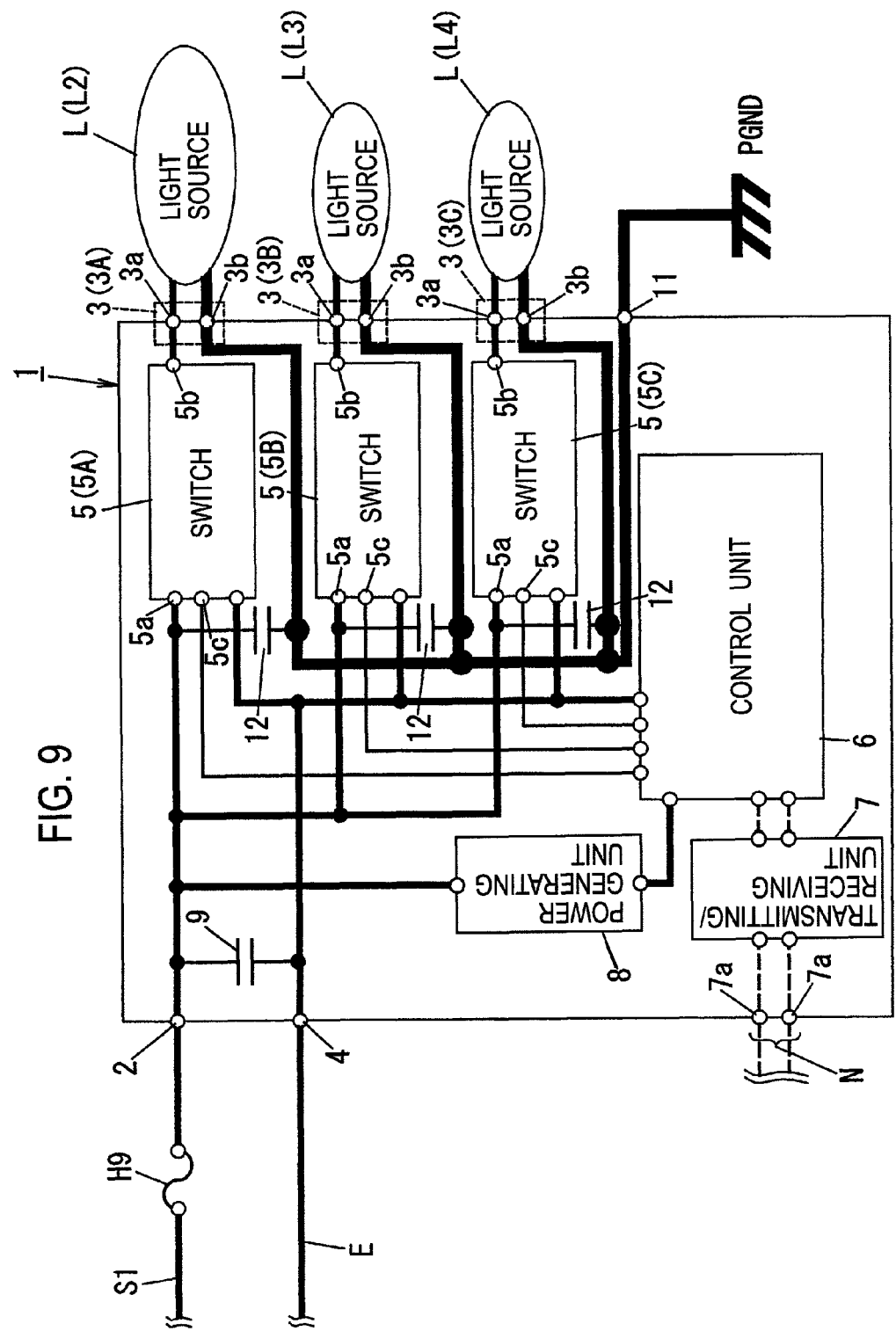
FIG. 9 is a schematic explanatory diagram of yet another example of the vehicle-mounted load controller.

The vehicle-mounted load controller 1 of this embodiment is not limited to the examples shown in FIGS. 3 and 8 and may also be, for example, such as shown in FIG. 9. The vehicle-mounted load controller 1 shown in FIG. 9 includes a vehicle grounding terminal 11 for a power ground PGND connected to the vehicle body 110 of the vehicle 100. Each of the lower-potential connecting terminals 3a of the load connecting portions 3 in FIG. 9 is connected to the vehicle grounding terminal 11 rather than the grounding terminal 4. On the other hand, the switches 5 and the control unit 6 are connected to the grounding terminal 4, and use the grounding line E as a ground. Moreover, a smoothing circuit 12 is connected in parallel with the series circuits each including the light source L connected to a load connecting portion 3 and the switch 5 corresponding to the load connecting portion 3, the smoothing circuit 12 including a smoothing capacitor for smoothing the voltage between the two ends of each of the series circuits. This smoothing circuit 12 is similar to the smoothing circuit 9.

The above-described vehicle-mounted load controller 1 shown in FIG. 9 also has similar effects to those of the vehicle-mounted load controllers 1 shown in FIGS. 3 and 8. It should be noted that the smoothing circuit 12 is not limited to one including only the smoothing capacitor. For example, an inductor may be inserted between the higher-potential side of the smoothing capacitor and the power terminal 2, or the smoothing circuit may be a noise filter such as a pi filter. The second to sixth embodiments described later may also have a configuration including the smoothing circuit 12.

Also, in the vehicle-mounted headlight device shown in FIG. 7, the enclosure 10 of the vehicle-mounted load controller 1 is disposed outside the lamp casing 121 of the front lamp unit 120. However, as shown in FIG. 10, the enclosure 10 may also be disposed inside the lamp casing 121. On the rear side of the lamp casing 121 shown in FIG. 10, an input-side waterproof connector 124a is provided which is connected to each of the power terminal 2, the grounding terminal 4, and the transmission line connecting terminals 7a of the vehicle-mounted load controller 1. A waterproof connector 124b as a counterpart of this input-side waterproof connector 124a is connected to each of the power line S1, the grounding line E, and the transmission lines N of the in-vehicle network. On the rear-surface side of the lamp casing 121, an output-side waterproof connector 125a is provided which is connected to each of the load connecting portions 3A to 3C of the vehicle-mounted load controller 1. A waterproof connector 125b as a counterpart of this output-side waterproof connector 125a is electrically connected to the respective power supply terminal portions 310 of the light sources L2 to L4. It should be noted that the waterproof connectors 124a, 124b, 125a, and 125b are connectors to which waterproofing is applied so as to prevent the entry of water into the live part thereof and the lamp casing 121 in a mutually connected state. These have been heretofore known, and therefore a description thereof will be omitted.

Accordingly, the power terminal 2, the grounding terminal 4, and the transmission line connecting terminals 7a of the vehicle-mounted load controller 1 are connected to the power line S1, the grounding line E, and the transmission lines N by connecting the waterproof connector 124b to the input-side waterproof connector 124a, and the load connecting portions 3 are connected to the light sources L by connecting the waterproof connector 125b to the output-side waterproof connector 125a.

In the vehicle-mounted headlight device shown in FIG. 10, the vehicle-mounted load controller 1 is housed in the lamp casing 121 to which waterproofing is generally applied. This eliminates the necessity of applying waterproofing to the vehicle-mounted load controller 1 itself. Thus, inexpensive connectors with relatively low-water-resistance or the like can be used for the power terminal 2 and the load connecting portions 3 of the vehicle-mounted load controller 1, and cost can be reduced. It should be noted that a lighting device 130 and a motor controller 150 may also be housed in the lamp casing 122 from the same point of view. Moreover, though different waterproof connectors 124a and 125a are respectively used for the input and output sides in the example shown in FIG. 10, one waterproof connector may be used for both input and output. Furthermore, though the enclosure 10 is attached to the lower-surface side of the lamp casing 121 in the example shown in FIG. 10, this is not intended to limit the attached position of the enclosure 10 to the lower-surface side of the lamp casing 121. The attached position of the enclosure 10 may also be the upper-surface or rear-surface side of the lamp casing 121.

On the other hand, in this embodiment, the in-vehicle network is a CAN network. However, the in-vehicle network is not limited to a CAN network. For example, a serial communication network, a LIN (Local Interconnect Network), a MOST (Media Oriented Systems Transport), a FlexRay, or the like may also be employed. Further, the light sources L2 to L4 as loads are not limited to incandescent lamps such as the aforementioned halogen lamps. The light sources L2 to L4 may also be LED light sources, and are not particularly limited. Moreover, loads to be controlled by the vehicle-mounted load controller 1 are not limited to the light sources L2 to L4, and may also be a light source L (hereinafter denoted by sign L7 as needed) for cornering which is used to improve visibility in turning by emitting light in the direction of inner wheels at the time of turning, or a light source L (hereinafter denoted by sign L8 as needed) for daytime lighting with which a vehicle makes its presence known to other vehicles even in the daytime to prevent an accident. Furthermore, the loads are not limited to light sources L, and may also be, for example, a swivel motor M1 or a leveling motor M2. Other than these, a night vision camera, a radar (e.g., millimeter wave radar), or the like may also be employed. In these regards, the second to sixth embodiments described later are similar.

Further, in the vehicle 100 shown in FIG. 4, the headlight includes separate light sources: the light source L1 for emitting a passing beam, and the light source L2 for emitting a driving beam. However, one light source for the headlight may be used for both these purposes. It should be noted, however, that in this case, a driver including a solenoid or the like is needed to vertically shift the direction of the optical axis of the light source for the headlight. It should be noted that a drive circuit for such a solenoid can be provided in the vehicle load controller 1 of this embodiment.

The control unit 6 of the vehicle-mounted load controller 1 of the first embodiment, upon receiving an on signal for a light source L, lights the light source L corresponding to the on signal. For example, in the case where an on signal for the light source L2 and an on signal for the light source L4 are simultaneously inputted at time T4 or T8 shown in FIG. 6, supplies of power to the light sources L2 and L4 are simultaneously started.

What should be noted here is that in the case where supplies of power to the light sources L are started when the light sources L are not sufficiently warmed, excessive inrush current temporarily flows in the early stage of the supply of power after the start thereof. Even if the magnitude of such inrush current is acceptable in a switch 5, when such inrush current occurs in multiple light sources L within a short period of time, the current flowing through the power supply path from the power line S1 to the power terminal 2 becomes very large. As a result, the fuse H9 may be blown.

To prevent a blowout of the fuse H9 due to such inrush current, it is conceivable that a fuse having a higher rating is used as the fuse H9. However, in the case where the fuse H9 having a higher rating is used, a blowout may be delayed when a blowout of the fuse H9 is truly required. This may cause serious damage to the battery, the loads, and the like.

A vehicle-mounted load controller 1 of this embodiment is made in view of the above-described point, and the operation of the control unit 6 thereof is different from that in the first embodiment. It should be noted that other components are similar to those in the first embodiment, and therefore a description and illustration thereof will be omitted.

In the case where supplies of power to multiple loads (in this embodiment, light sources L) for different uses are started within a predetermined period in response to inputted control signals, the control unit 6 of this embodiment controls the corresponding switches 5 so that power is supplied to the multiple light sources L for different uses in order with a predetermined interval of time. In other words, the control unit 6 of this embodiment avoids simultaneously performing supplies of power to the multiple light sources L.

More specifically, when on signals for light sources L for different uses are simultaneously inputted, the control unit 6 outputs a switching control signal for on to the switch 5 for the light source L given the highest preset priority; then, when the predetermined interval of time has elapsed, the control unit 6 outputs a switching control signal for on to the switch 5 for the light source L given the second highest priority. Such an operation is repeated until supplies of power to all the light sources L for which on signals are simultaneously inputted are completed. Moreover, when an on signal for a light source L is inputted, the control unit 6 starts the supply of power to the light source L, and starts counting the predetermined period at that time. In the case where an on signal for a different light source L is inputted before the predetermined period expires, the control unit 6 does not immediately start the supply of power to the different light source L, but controls the switches 5 so that the supply of power to the different light source L may be started after the predetermined interval of time has elapsed since the start of supply of power to the preceding light source L. On the other hand, in the case where an on signal for a different light source L is inputted after the predetermined period has expired, the control unit 6 immediately starts the supply of power to the different light source L without waiting until the predetermined interval of time elapses since the start of supply of power to the light source L.

For example, in this embodiment, the light sources L2, L3, and L4 are given priorities in that order. In other words the driving-beam light source L2 which is a headlight is given the highest priority, and the blinker light source L4 is given the lowest priority. The predetermined interval of time has a value set in consideration of the full width at half maximum of inrush current of the light source L, e.g., a value in the range from several milliseconds to approximately 10 milliseconds, and is set to 5 ms in this embodiment. Moreover, the predetermined period is set with reference to the time that the current supplied to the light source L takes to almost stabilize, and is set to a period (less than 5 ms) shorter than the predetermined interval of time (in this embodiment, 5 ms). It should be noted that though the predetermined period may be longer than the predetermined interval of time, the predetermined period is preferably set approximately equal to the predetermined interval of time because the excessive lengthening thereof causes unnecessary delay in control.

Next, the operation of the vehicle-mounted load controller 1 of this embodiment will be explained with reference to FIGS. 11 and 12. It should be noted that part (a) of FIG. 11 and part (a) of FIG. 12 each show a timing chart of a control signal (on or off signal) for the light source L2, part (b) of FIG. 11 and part (b) of FIG. 12 each show that of a control signal for the light source L3, and part (c) of FIG. 11 and part (c) of 12 each show that of a control signal for the light source L4. Further, part (d) of FIG. 11 and part (d) of FIG. 12 each show a timing chart of the consumption current of the light source L2, part (e) of FIG. 11 and part (e) FIG. 12 each show that of the consumption current of the light source L3, and part (f) of FIG. 11 and part (f) of FIG. 12 each show that of the consumption current of the light source L4.

As shown in FIG. 11, at time T1, upon receiving an on signal for the light source L2, the control unit 6 starts the supply of power to the light source L2. After that, at time T2, upon receiving an on signal for the light source L3, the control unit 6 starts the supply of power to the light source L3. After that, at time T3, upon receiving an off signal for the light source L2, the control unit 6 stops the supply of power to the light source L2.

After that, at time T4, upon simultaneously receiving an on signal for the light source L2 and an on signal for the light source L4, the control unit 6 controls the respective corresponding switches 5 so that supplies of power to the multiple loads for different uses may be performed in order with a predetermined interval of time (in this embodiment, 5 ms) therebetween, which is longer than the predetermined period. In other words, the control unit 6 starts the supply of power to the light source L2, and, at the same time, controls the switches 5A and 5C so that the supply of power to the light source L4 may be started at time t1 5 ms after the time T4 at which the supply of power to the light source L2 is started.

After the above-described time T4, at time T5, upon receiving an off signal for the light source L3, the control unit 6 stops the supply of power to the light source L3. After that, at time T6, upon receiving an off signal for the light source L2, the control unit 6 stops the supply of power to the light source L2. After that, at time T7, upon receiving an off signal for the light source L4, the control unit 6 stops the supply of power to the light source L4.

After that, at time T8, upon simultaneously receiving an on signal for the light source L2 and an on signal for the light source L4, the control unit 6 starts the supply of power to the light source L2, and, at the same time, controls the switches 5A and 5C so that the supply of power to the light source L4 may be started at time t2 5 ms after the time T8 at which the supply of power to the light source L2 is started, as described above. After that, at time T9, upon simultaneously receiving an off signal for the light source L2 and an off signal for the light source L4, the control unit 6 outputs switching control signals for off to the switches 5A and 5C, respectively, and stops the supply of power to the light sources L2 and L4.

Figure 12:
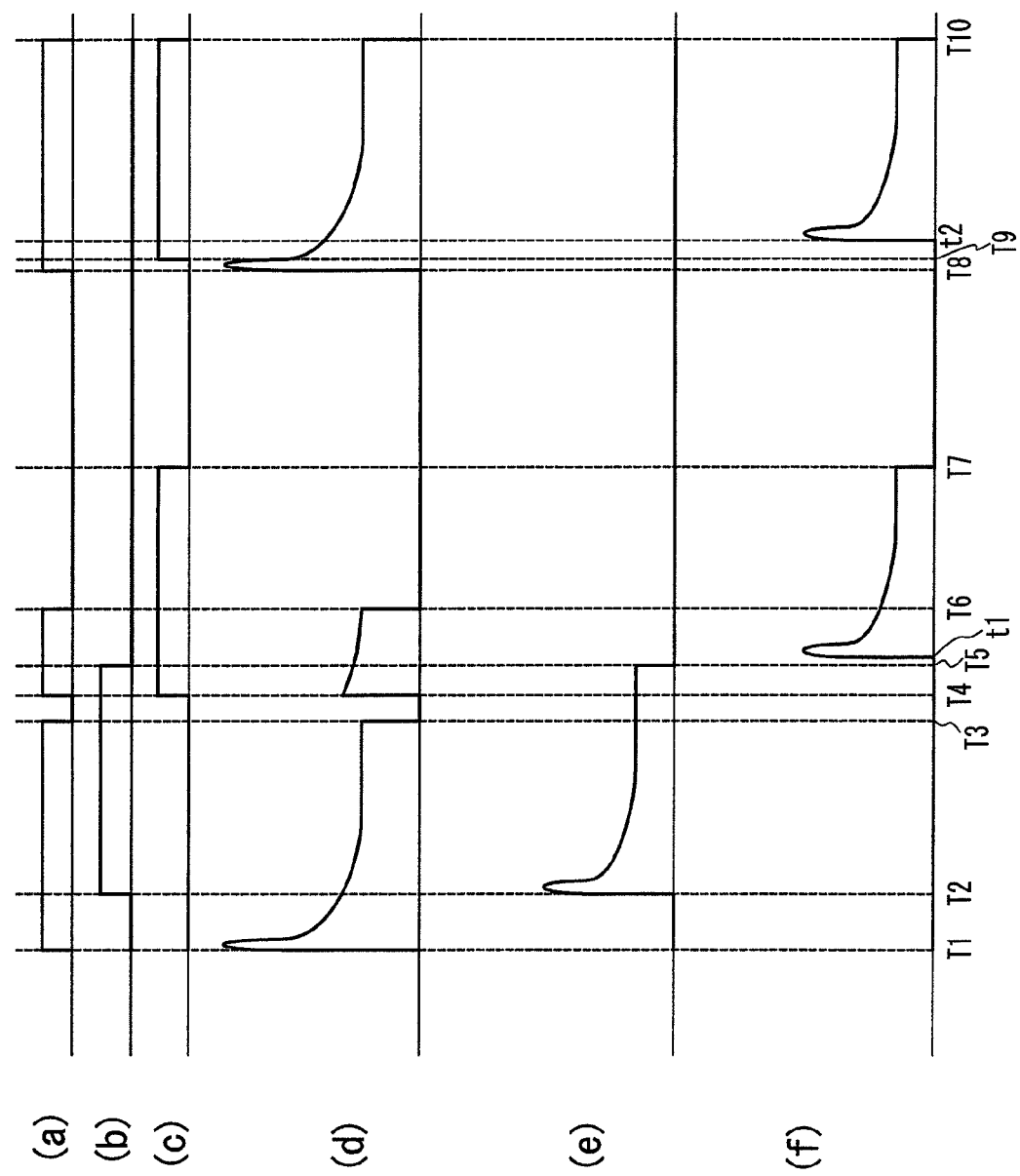
FIG. 12 is a timing chart showing the operation of the vehicle-mounted load controller.

On the other hand, as shown in FIG. 12, at time T8, upon receiving an on signal for the light source L2, the control unit 6 starts the supply of power to the light source L2. Further, at time T9 before the predetermined period elapses since time T8, upon receiving an on signal for the light source L4, the control unit 6 controls the switch 5C so that the supply of power to the light source L4 may be started at time t2 5 ms after the time T8 at which the supply of power to the light source L2 is started. Thus, supplies of power to the multiple light sources L2 and L4 for different uses are performed in order (in the order of priority) with a predetermined interval of time (in this embodiment, 5 ms) therebetween, which is longer than the predetermined period.

Further, after time T9, at time T10, upon receiving an off signal for the light source L2, the control unit 6 stops the supply of power to the light source L3. After that, at time T11, upon receiving an off signal for the light source L4, the control unit 6 stops the supply of power to the light source L4. It should be noted that the operation of the control unit 6 at times T1, T2, T3, T4, T5, t1, T6, and T7 before time T8 is the same as that in the aforementioned example shown in FIG. 11, and a description thereof will be omitted.

The above-described vehicle-mounted load controller 1 of this embodiment has similar effects to those of the first embodiment. Further, in the case where multiple light sources L are lit within a predetermined period, the multiple light sources L are lit in order. Accordingly, unlike in the first embodiment, it is possible to prevent a blowout of the fuse H9 between the power terminal 2 and the power line S1 due to a phenomenon in which current temporarily increases in the multiple light sources within a short period in the early stage of supplies of power to the light sources L after the start thereof. Thus, the multiple light sources L can be prevented from simultaneously becoming unusable. Moreover, since the rating of the fuse H9 can be set to an appropriate value, a delay of a blowout can be prevented from occurring when a blowout of the fuse H9 is truly required, thereby preventing serious damage to the battery, the loads, and the like.

Third Embodiment

Figure 13:
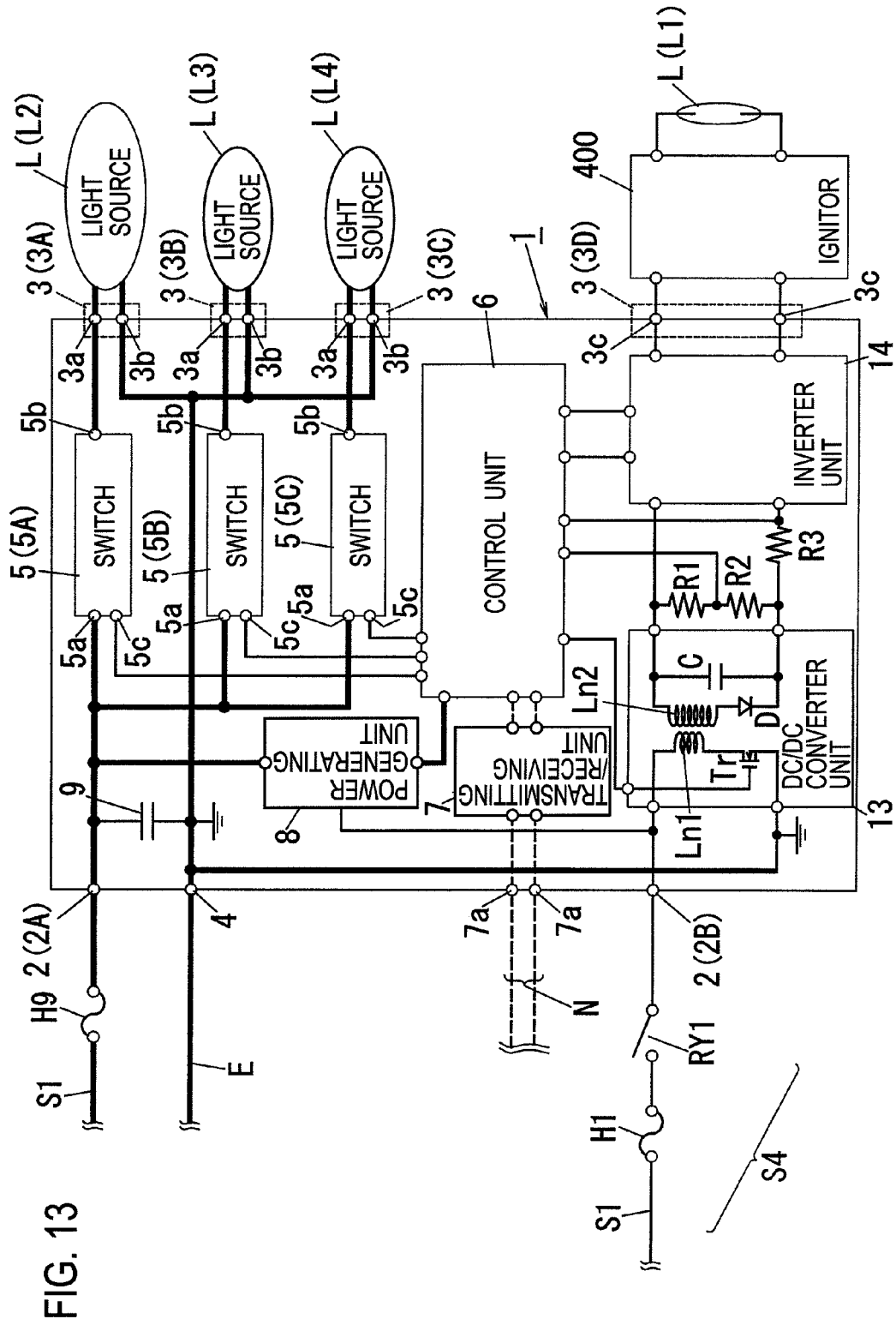
FIG. 13 is a schematic explanatory diagram of a vehicle-mounted load controller of a third embodiment.

As shown in FIG. 13, a vehicle-mounted load controller 1 of this embodiment includes: a power terminal 2 connected to the power line S1 of the vehicle-mounted battery through a fuse H1 and a relay RY1 of the relay/fuse box; a load connecting portion 3 which serves as a load connecting portion for a high-intensity discharge lamp and to which a light source L1 as a high-intensity discharge lamp is electrically connected through an ignitor 400; a DC/DC converter unit (hereinafter simply referred to as the "converter unit") 13; and an inverter unit 16. The vehicle-mounted load controller 1 of this embodiment differs from that of the first embodiment in that the control unit 6 has the function of controlling each of the converter unit 13 and the inverter unit 14. It should be noted that other components are similar to those in the first embodiment and therefore denoted by the same signs, and a description thereof will be omitted.

Unlike the first embodiment including only one power terminal 2, the vehicle-mounted load controller 1 of this embodiment has the multiple power terminals 2. Accordingly, for the sake of distinction of the multiple power terminals 2 from each other, the power terminal 2 connected to the power line S1 through the fuse H9 of the relay/fuse box 200 is denoted by sign 2A, and the power terminal 2 connected to the power line S1 through the fuse H1 and the relay RY1 of the relay/fuse box 200 is denoted by sign 2B, as needed. Moreover, the load connecting portion 3 to which the light source L1 is connected through the ignitor 400 is denoted by sign 3D as needed for the sake of distinction from the load connecting portions 3A to 3C. It should be noted that in FIGS. 14 to 16, the fuses H1 and H9 and the relay RY1 are not shown.

In the vehicle-mounted load controller 1, the converter unit 13, the inverter unit 14, and the control unit 6 constitute a lighting circuit unit for the light source L1 being a high-intensity discharge lamp.

The converter unit 13 converts the DC voltage between the power terminal 2B and the ground to a DC voltage having a predetermined value. The converter unit 13 includes a transformer, a switching element Tr, and a reverse blocking diode D. The transformer includes a primary winding Ln1 arranged between the power terminal 2B and the ground, and a secondary winding Ln2 having a smoothing capacitor C connected between the two ends thereof. The switching element Tr is formed by a MOSFET and arranged between the primary winding Ln1 and the ground. The reverse blocking diode D is arranged between the higher-potential side of the secondary winding Ln2 and the smoothing capacitor C. In the above-described converter unit 13, a desired DC voltage can be generated between the two ends of the secondary winding Ln2 by controlling the duty factor, i.e., the ratio of on-time to off-time, of the switching element Tr. It should be noted that as the above-described converter unit 13, a conventionally known one can be employed, and therefore a detailed description thereof will be omitted.

The inverter unit 14 generates power (AC power) for lighting the light source L1 from the DC voltage outputted by the converter unit 13, and applies an AC voltage (e.g., AC square wave voltage) between a pair of electrodes of the light source L1, thus lighting the light source L1. It should be noted that as the above-described inverter unit 14, a conventionally known one can be employed, and therefore a description thereof will be omitted.

Upon receiving an on signal for the light source L1 through the transmitting/receiving unit 7, the control unit 6 of this embodiment monitors the DC voltage outputted by the converter unit 13 through a voltage divider including resistors R1 to R3. Then, the control unit 6 controls the switching element Tr of the converter unit 13 so that the DC voltage may have a desired value, and controls the inverter unit 14 to generate AC power for lighting the light source L1, thus lighting the light source L1. On the other hand, upon receiving an off signal for the light source L1, the control unit 6 stops the operation of the converter unit 13 and the inverter unit 14, thus extinguishing the light source L1. It should be noted that control operations (control operations relating to the switches 5) relating to the light sources L2 to L4 are similar to those of the first embodiment. Moreover, as in the second embodiment, in the case where supplies of power to multiple light sources L are started within a predetermined period in response to inputted control signals, the switches 5 may be controlled so that the timings of starting the supplies of power to the multiple light sources L may be shifted from each other by a predetermined interval of time longer than the predetermined period.

The load connecting portion 3D has a pair of connecting terminals 3c to which the output terminals of the inverter unit 14 are connected, respectively. To these connecting terminals 3c, the light source L1 is electrically connected through the ignitor 400. This ignitor 400 is intended to enable a quick start of a high-intensity discharge lamp by applying a high voltage to the high-intensity discharge lamp. It should be noted that as the ignitor 400, a conventionally known one can be employed, and therefore a description thereof will be omitted.

The power terminal 2B is connected to the power line S1 through the fuse H1 and the relay RY1 of the relay/fuse box 200. The relay RY1 is turned on when a user performs an operation for turning on the passing beam of the vehicle 100, and is turned off when a user performs an operation for turning off the passing beam. Accordingly, supplies of power to the power line S1 and the relay RY1 are started when an operation for turning on the passing beam is performed, and are stopped when an operation for turning off the passing beam is performed. In other words, the power line S1 and the relay RY1 constitute a power line S4 synchronized with a switch for the passing beam.

Moreover, the power generating unit 8 of this embodiment is connected to the power terminal 2B as well as the power terminal 2A. The power generating unit 8 generates operating power for the control unit 6 from the electric power obtained from at least one of the power line S1 connected to the power terminal 2A and the power line S4 connected to the power terminal 2B, and supplies the operating power to the control unit 6. Accordingly, even if electric power is not obtained from the power line S1 due to a blowout of the fuse H9, the control unit 6 can operate by the electric power from the power line S4.

The above-described vehicle-mounted load controller 1 of this embodiment has similar effects to those of the first embodiment.

Besides, the vehicle-mounted load controller 1 of this embodiment includes the power terminal 2B connected to the power line S4 to serve as a power terminal for the passing beam, and the power terminal 2A connected to the power line S1 to serve as an full time power terminal; and further includes the load connecting portion 3D to which the light source L1 is connected and which serves as a load connecting portion for the passing beam, and the multiple load connecting portions 3A to 3C to which the light sources L2 to L4 always allowed to emit light are connected and which serve as full time load connecting portions. To the power terminal 2B, the load connecting portion 3D is electrically connected through the lighting circuit unit. To the power terminal 2A, as described in the first embodiment, the multiple load connecting portions 3A to 3C are electrically connected to which the multiple light sources L2 to L4 for different uses are respectively connected.

Accordingly, in the vehicle-mounted load controller 1 of this embodiment, the light source L1 for the passing beam can be allowed to emit light by a user performing an operation for turning on the passing beam, whereas light sources (in this embodiment, light sources L2 to L4) except the light source for the passing beam can be allowed to emit light, irrespective of operations by a user.

Moreover, the vehicle-mounted load controller 1 of this embodiment includes: the load connecting portion 3D to which the light source L1 as a high-intensity discharge lamp is electrically connected and which serves as a load connecting portion for a high-intensity discharge lamp; and the lighting circuit unit which is arranged between the load connecting portion 2D and the power terminal 2B and which generates power for the light source L1 from the electric power obtained from the power line S4 connected to the power terminal 2B to supply the generated power to the light source L1 connected to the load connecting portion 3D. Accordingly, it is possible to light a high-intensity discharge lamp widely available as a light source for a passing beam. Thus, the use of the vehicle-mounted load controller 1 of this embodiment eliminates the necessity of the lighting device 130. Moreover, the vehicle-mounted load controller 1 of this embodiment also includes the smoothing circuit 9 such as in the first embodiment. This can reduce the fluctuation of the potential (i.e., the potential of the power line S1 connected to the power terminal 2) at the power terminal 2 due to the lighting or extinction of the light sources L, and can reduce the influence of the noise (normal mode noise) occurring in the power supply paths to the light sources L on the switches 5 and the light sources L. Besides, the enclosure 10 is housed in the lamp casing 121. This makes current loops for the current flowing through the light sources L shorter than in the case (see FIG. 7) where the enclosure 10 is located outside the lamp casing 121 as in the first embodiment. Thus, the noise can be further reduced.

It should be noted that the multiple power terminals 2 in this embodiment are not limited to a combination of the power terminal 2B serving as the power terminal for the passing beam and the power terminal 2A serving as the full time power terminal, and need only to include the power terminal for the passing beam and the full time power terminal. Other than these, a power terminal 2 connected to the power line S2 or a power terminal 2 connected to the power line S3 may also be provided. Moreover, instead of the power terminal for the passing beam, a power terminal 2 connected to the power line S2 or a power terminal 2 connected to the power line S3 may be used. In short, the multiple power terminals 2 need only to include a power terminal 2 connected to a power line for which the supply of power from the vehicle-mounted battery is started or stopped when a user performs a predetermined operation, e.g., an operation for turning on the passing beam, an operation for turning on the ignition (operation of an ignition key), or the like. This enables a user to select a light source L to be allowed to emit light among multiple light sources L for different uses by performing a predetermined operation.

Moreover, the multiple load connecting portions 3 are not limited to a combination of the load connecting portion 3D serving as the load connecting portion for the passing beam and the multiple load connecting portions 3A to 3C serving as the full time load connecting portions, and need only to include the load connecting portion for the passing beam and the full time load connecting portion. Moreover, the full time load connecting portions are not limited to the load connecting portions 3A to 3C corresponding to the light sources L2 to L4, respectively, and may include a load connecting portion 3 corresponding to a light source L (hereinafter denoted by sign L7 as needed) for cornering and a load connecting portion 3 corresponding to a light source L (hereinafter denoted by sign L8 as needed) for daytime lighting.

The above-described configuration enables the light source L2 for the driving beam, the light source L3 for the width indicator, the light source L4 for the blinker, the light source L7 for cornering, and the light source L8 for daytime lighting can be allowed to emit light, irrespective of operations by a user.

Figure 14:
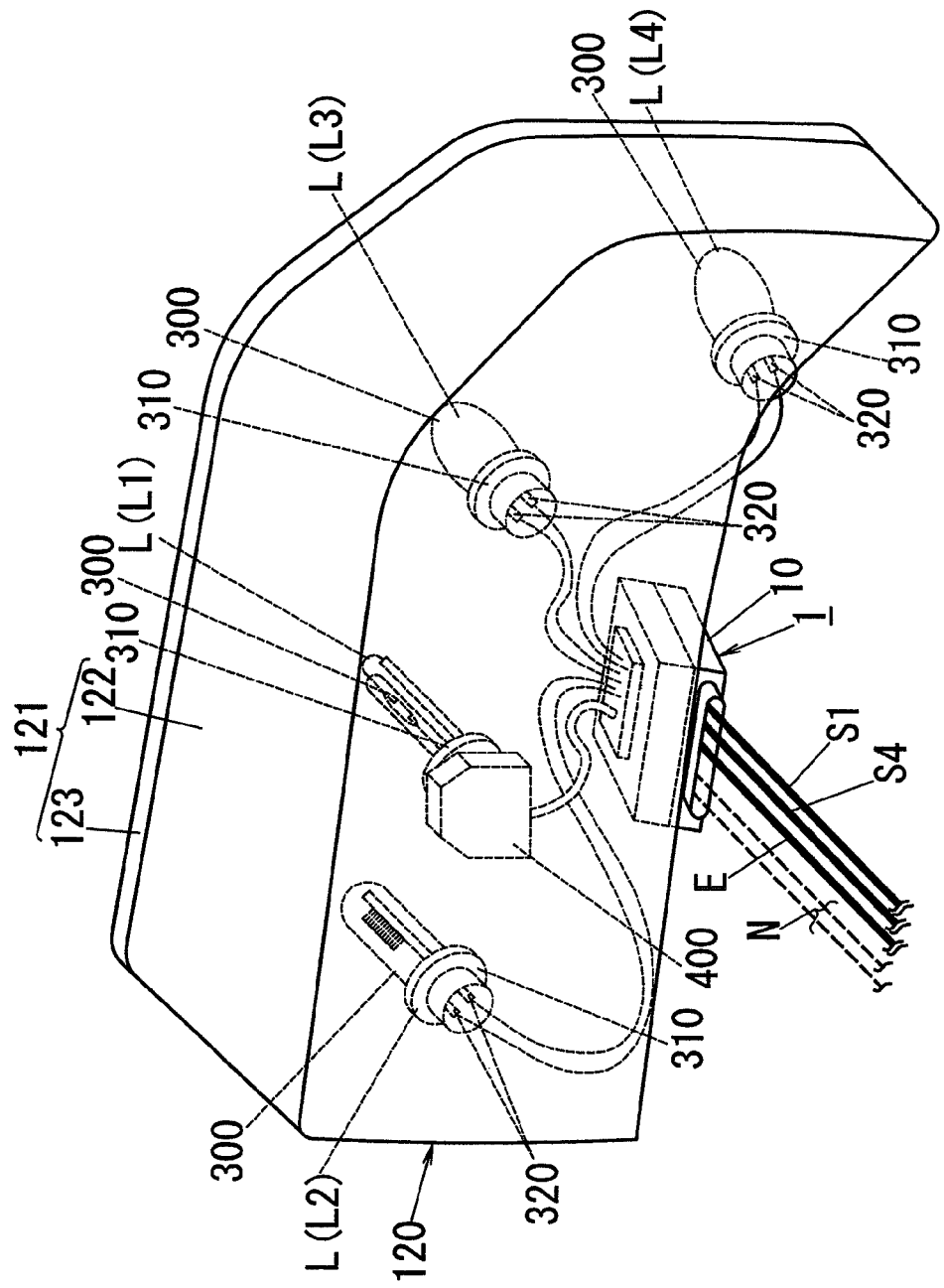
FIG. 14 is a perspective view of a vehicle-mounted headlight device including the vehicle-mounted load controller.

The above-described vehicle-mounted load controller 1 of this embodiment is, for example, used for a front lamp unit 120 such as shown in FIG. 14, and constitutes a vehicle-mounted headlight device together with the front lamp unit 120. It should be noted that components in FIG. 13 which are similar to those of the first embodiment will be denoted by the same signs, and a description thereof will be omitted. In this regard, FIGS. 14 and 15 are the same.

The front lamp unit 120 shown in FIG. 14 includes a box-shaped lamp casing 121 installed in a front face of the vehicle body 110 of the vehicle 100, and the multiple light sources L1 to L4. The light sources L1 to L4 are attached to the lamp casing 121 in such a way that the light sources L1 to L4 are located entirely within the lamp casing 121. Further, as shown in FIG. 14, the enclosure 10 of the vehicle-mounted load controller 1 is attached to the lower-surface side of the lamp casing 121 in such a way that the power terminals 2, the grounding terminal 4, and the transmission line connecting terminals 7a are exposed outside the lamp casing 121 and that all the load connecting portions 3 are exposed inside the lamp casing 121. Accordingly, connection to the power lines S1 and S4, the grounding line E, and the transmission lines N is performed outside the lamp casing 121, and connection to the light sources L1 to L4 is performed inside the lamp casing 121.

In the above-described vehicle-mounted headlight device, the power terminals 2 are located outside the lamp casing 121. This eliminates the necessity of drawing connecting lines (e.g., harness) for connecting the power lines S1 and S4 to the power terminals 2 into the lamp casing 121, and therefore eliminates the necessity of waterproofing of the lamp casing 121 which would be needed in the case where the connecting lines are drawn into the lamp casing 121. Moreover, the load connecting portions 3 are located inside the lamp casing 121. Accordingly, there is no need to use waterproof connectors or the like for the load connecting portions 3. Besides, the light sources L can be connected to the load connecting portions 3 within the lamp casing 121. Further, cable runs between the light sources L and the load connecting portions 3 can be made shorter than in the case (see FIG. 7) where the enclosure 10 is located outside the lamp casing 121 as in the first embodiment. This shortens current loops for the current flowing through the light sources L. Thus, the noise can be reduced.

Figure 15:
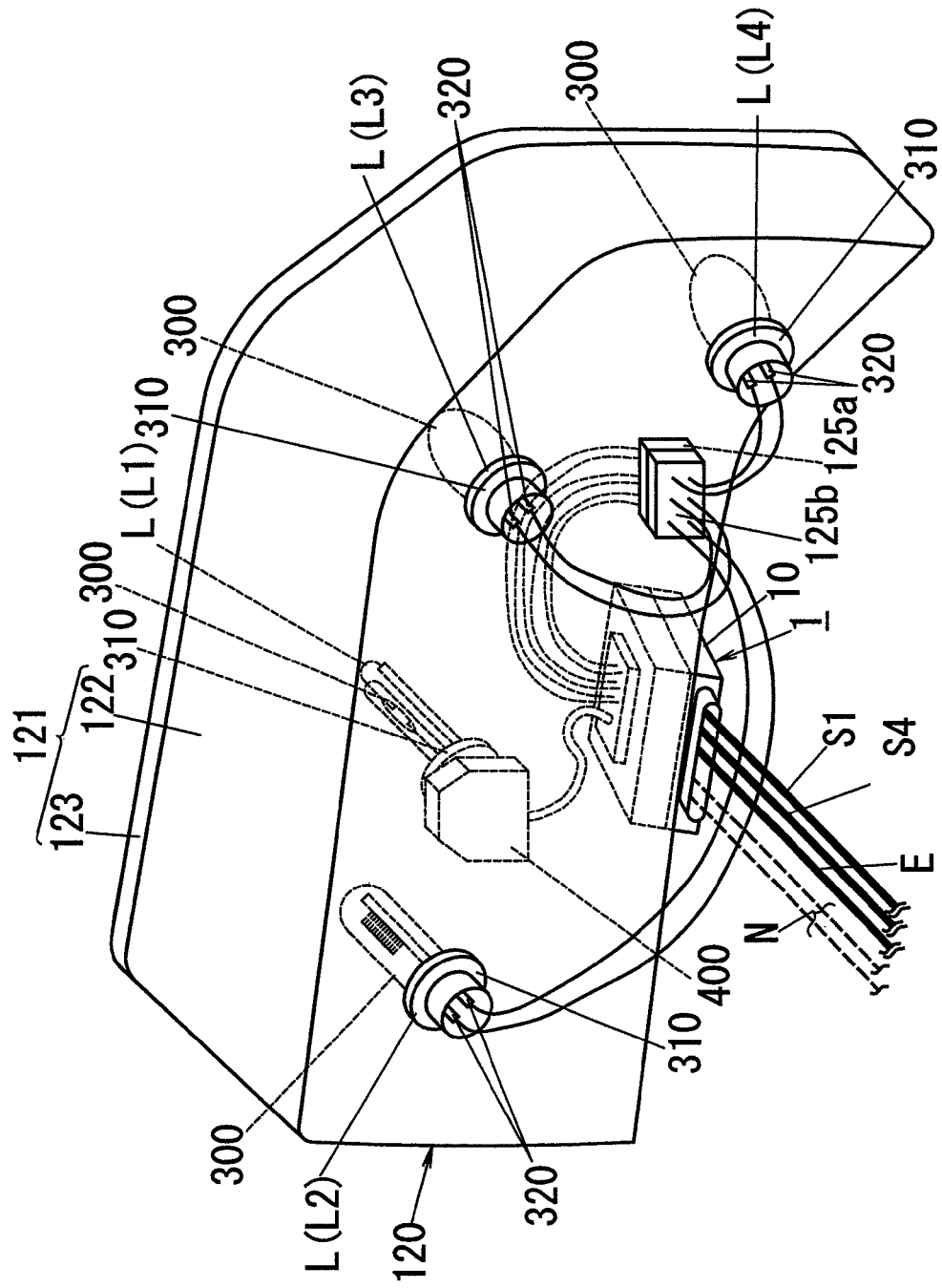
FIG. 15 is a perspective view of another example of the vehicle-mounted headlight device including the vehicle-mounted load controller.

Alternatively, the vehicle-mounted load controller 1 of this embodiment may, for example, constitute a vehicle-mounted headlight device together with a front lamp unit 120 such as shown in FIG. 15. It should be noted that components similar to those of the first embodiment will be denoted by the same signs, and a description thereof will be omitted.

The front lamp unit 120 shown in FIG. 15 includes a box-shaped lamp casing 121 installed in a front face of the vehicle body 110 of the vehicle 100, and the multiple light sources L1 to L4. The lamp casing 121 shown in FIG. 15 includes a housing 122 and a translucent cover 123. On the rear-surface side of the housing 122, openings (not shown) are formed through which the respective light-emitting portions 300 of the light sources L2 to L4 are inserted into the lamp casing 121. The light sources L2 to L4 are attached to the lamp casing 121 in such a way that the light-emitting portions 300 are located inside the lamp casing 121 and that the bases 310 (power supply terminal portions 320) are located outside the lamp casing 121. Moreover, the light source L1 is attached to the lamp casing 121 in such a way that the light source L1 is located entirely within the lamp casing 121.

Further, the enclosure 10 of the vehicle-mounted load controller 1 is attached to the lower-surface side of the lamp casing 121 in such a way that the power terminals 2, the grounding terminal 4, and the transmission line connecting terminals 7a are exposed outside the lamp casing 121 and that all the load connecting portions 3 are exposed inside the lamp casing 121.

Along with this, on the rear-surface side of the lamp casing 121, an output-side waterproof connector 125a is provided which is connected to each of the load connecting portions 3A to 3C of the vehicle-mounted load controller 1. A waterproof connector 125b as a counterpart of this output-side waterproof connector 125a is electrically connected to the respective power supply terminal portions 310 of the light sources L2 to L4.

Accordingly, connection to the power lines S1 and S4, the grounding line E, and the transmission lines N is performed outside the lamp casing 121, and connection to the light source L1 is performed inside the lamp casing 121. The light sources L2 to L4 are connected to the load connecting portions 3A to 3C by connecting the waterproof connector 125b to the output-side waterproof connector 125a. In other words, the light sources L2 to L4 are connected to the load connecting portions 3A to 3C by an electric cable having one end connected to the load connecting portions 3 in the lamp casing and the other end drawn outside the lamp casing 121 to be connected to the power supply terminal portions 320 of the light sources L.

In the above-described vehicle-mounted headlight device, the power terminals 2 are located outside the lamp casing 121. This eliminates the necessity of drawing connecting lines for connecting the power lines S1 and S4 to the power terminals 2 into the lamp casing 121, and therefore eliminates the necessity of waterproofing of the lamp casing 121 which would be needed in the case where the connecting lines are drawn into the lamp casing 121. Moreover, the load connecting portions 3 are located inside the lamp casing 121. Accordingly, there is no need to use waterproof connectors or the like for the load connecting portions 3.

Moreover, the vehicle-mounted load controller 1 includes the multiple load connecting portions 3 corresponding to all the multiple loads (light sources L1 to L4) included in the front lamp unit 120. This makes it possible to control all the light sources L provided in the front lamp unit 120. Controlling all the loads in the lamp casing 121 with the vehicle-mounted load controller 1 as described above eliminates the necessity of providing current supply wiring outside the lamp casing 121. In particular, there are many complicated and high-temperature components, such as an engine, in the vicinity of the lamp casing 121 of the front lamp unit 120. Accordingly, by placing the wiring to the loads entirely within the lamp casing 121, the wirings are prevented from contacting the complicated and high-temperature components. This can improve safety. Moreover, the power terminals 2 and the like of the vehicle-mounted load controller 1 are located outside the lamp casing 121. This eliminates the necessity of providing a connector in the lamp casing 121 itself. Accordingly, the shape of the lamp casing 121 can be made a relatively simple shape. Thus, the miniaturization and cost reduction of the front lamp unit 120 can be achieved.

Figure 16:
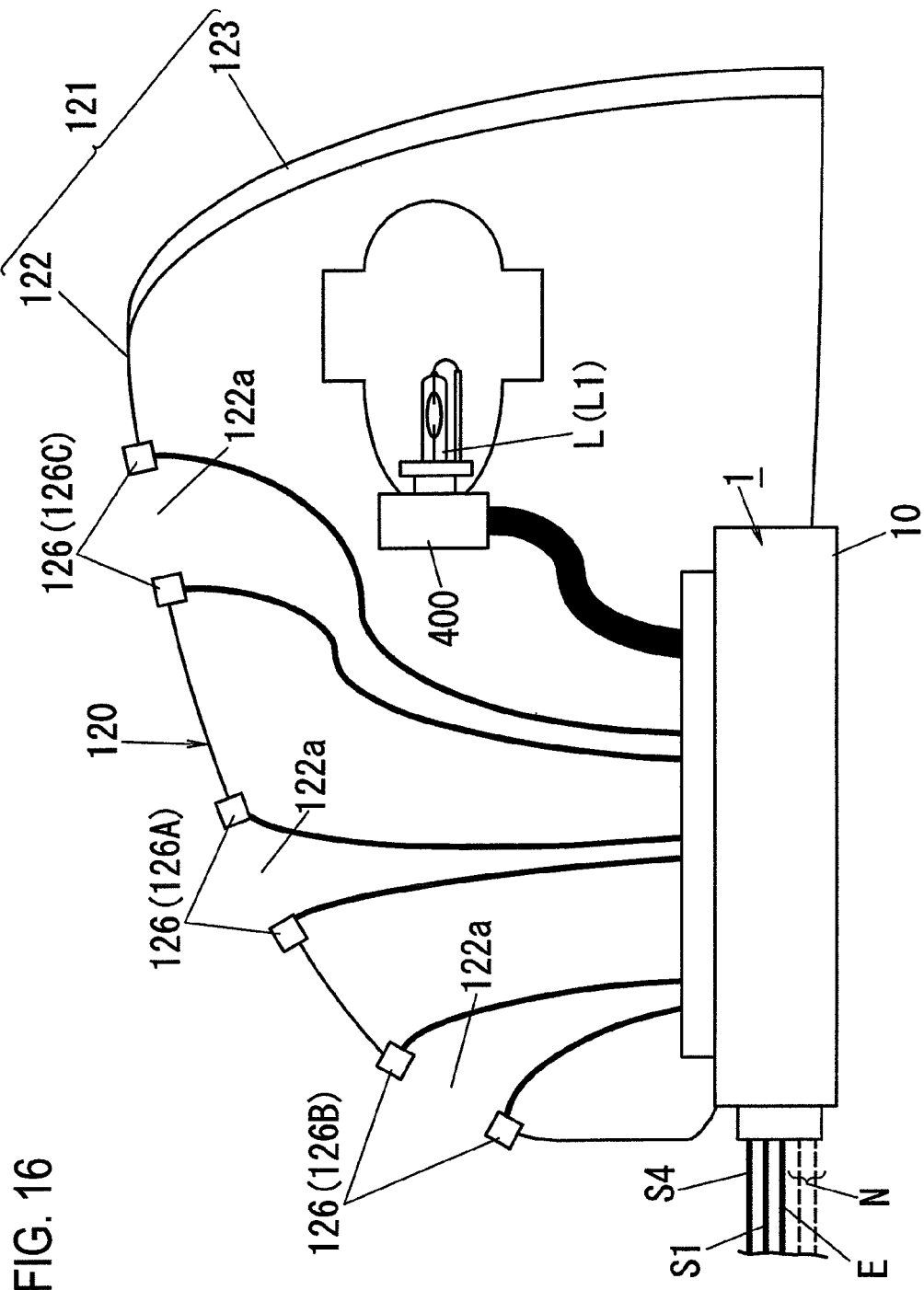
FIG. 16 is a perspective view of yet another example of the vehicle-mounted headlight device including the vehicle-mounted load controller.

Also, the vehicle-mounted load controller 1 of this embodiment may be, for example, used in a vehicle-mounted headlight device together with a front lamp unit 120 such as shown in FIG. 16. It should be noted that components similar to those of the first embodiment will be denoted by the same signs, and a description thereof will be omitted.

The front lamp unit 120 shown in FIG. 16 includes a box-shaped lamp casing 121 installed in a front face of the vehicle body 110 of the vehicle 100, and multiple light sources L1 to L4. The lamp casing 121 shown in FIG. 16 includes a housing 122 and a translucent cover 123 as in the first embodiment. On the upper-surface side of the housing 122, multiple (three in the shown example) openings 122a are formed through which the light-emitting portions 300 of the light sources L2 to L4 are inserted into the lamp casing 121, respectively.

The light sources L2 to L4 for use in the front lamp unit 120 shown in FIG. 16 each include a light-emitting portion (bulb) 300, a base 310, and a pair of power supply terminal portions 320. The light-emitting portion 300 includes a glass tube. The base 310 is provided on the base side of the light-emitting portion 300. The pair of power supply terminal portions 320 applies a voltage between the two ends of the filament in the light-emitting portion 300. However, as shown in part (a) of FIG. 17, the power supply terminal portions 320 are provided in the portion (portion of the base 310 on the light-emitting portion 300 side) of the base 310 facing the lamp casing 121 (housing 122) in a state where the light-emitting portion 300 is inserted into the lamp casing 121 through the opening 122a of the housing 122. In other words, in the light sources L2 to L4 for use in the front lamp unit 120 shown in FIG. 16, as shown in part (a) of FIG. 17, the power supply terminal portions 320 are not ones provided on the opposite side of the base 310 from the light emitting portion 300 in a protruding manner.

Along with this, a pair of connector portions 126 is provided on a peripheral portion of each of the openings 122a of the housing 122. To each pair of connector portions 126, the pair of power supply terminal portions 320 of the corresponding one of the light sources L2, L3, and L4 having the light-emitting portion 300 inserted in the lamp casing 121 through the opening 122a is electrically connected. Each of these connector portions 126 is mechanically connected to the corresponding base 310 as well as electrically connected to the corresponding power supply terminal portion 320. It should be noted that in FIG. 16, for the sake of distinction of the multiple connector portions 126 from each other, the connector portions 126 for the light source L2 are denoted by sign 126A, the connector portions 126 for the light source L3 are denoted by sign 126B, and the connector portions 126 for the light source L4 are denoted by sign 126C.

Figure 18:
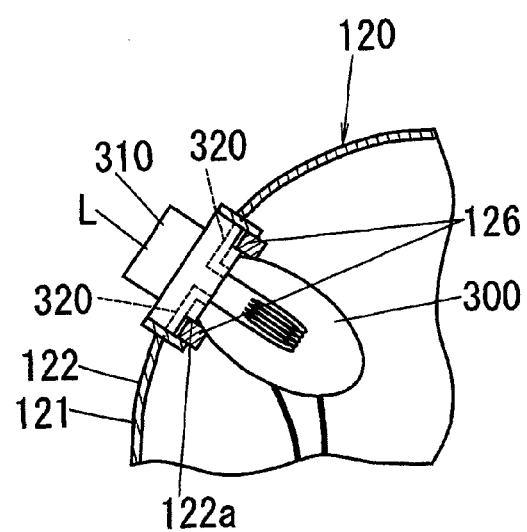
FIG. 18 is an explanatory diagram showing a state in which the light source is attached to the vehicle-mounted headlight device including the vehicle-mounted load controller.

In the front lamp unit 120 shown in FIG. 16, each of the light sources L2 to L4 is attached to the lamp casing 121 by inserting the light-emitting portion 300 into the lamp casing 121 through the opening 122a of the housing 122 and connecting the power supply terminal portions 320 to the connector portions 126 formed on the peripheral portion of the opening 122a as shown in FIG. 18. It should be noted that when the light source L is attached to the lamp casing 121, waterproofing is applied between the base 310 of the light source L and the opening 122a of the housing 122 with a waterproofing member such as an O ring (not shown) so as to prevent the entry of water and the like into the lamp casing 121 through the opening 122a.

Further, the enclosure 10 of the vehicle-mounted load controller 1 is attached to the lower-surface side of the lamp casing 121 in such a way that the power terminals 2, the grounding terminal 4, and the transmission line connecting terminals 7a are located outside the lamp casing 121 and that all the load connecting portions 3 are located inside the lamp casing 121. The load connecting portion 3A is electrically connected to the connector portions 126 corresponding to the light source L2. The load connecting portion 3B is electrically connected to the connector portions 126 corresponding to the light source L3. The load connecting portion 3C is electrically connected to the connector portions 126 corresponding to the light source L3. It should be noted that the light source L1 is attached to the lamp casing 121 in such a way that the light source L1 is located entirely within the lamp casing 121, and connected to the load connecting portion 3D of the vehicle-mounted load controller 1 through the ignitor 400.

In the above-described vehicle-mounted headlight device, the power terminals 2A and 2B are located outside the lamp casing 121. This eliminates the necessity of drawing connecting lines for connecting the power lines S1 and S4 to the power terminals 2A and 2B into the lamp casing 121, and therefore eliminates the necessity of waterproofing of the lamp casing which would be needed in the case where the connecting lines are drawn into the lamp casing 121. Moreover, the light sources L can be connected to the load connecting portions 3 by attaching the light sources L to the lamp casing 121. Accordingly, the connecting of the light sources L to the load connecting portions 3 and the attaching of the light sources L to the lamp casing 121 can be simultaneously performed. This simplifies assembly work, and facilitates work such as the replacement of a light source L. Besides, the light sources L can be connected to the load connecting portions 3 within the lamp casing 121. Further, cable runs between the light sources L and the load connecting portions 3 can be made shorter than in the case (see FIG. 7) where the enclosure 10 is located outside the lamp casing 121 as in the first embodiment. This shortens current loops for the current flowing through the light sources L. Thus, the noise can be reduced.

It should be noted that though the enclosure 10 is attached to the lower-surface side of the lamp casing 121 in the examples shown in FIGS. 14 to 16, this is not intended to limit the attached position of the enclosure 10 to the lower-surface side of the lamp casing 121. The attached position of the enclosure 10 may also be the upper-surface or rear-surface side of the lamp casing 121.

Fourth Embodiment

In the vehicle-mounted load controller 1 of the third embodiment, in the case where there is no need to vary the timing at which the light source L1 is allowed to emit light and the timing at which the light sources L2 to L4 is allowed to emit light, the converter unit 13 may be connected to the power terminal 2A without providing the power terminal 2B. In this case, all supplies of power to the light sources L1 to L4 are performed using the power line S1 connected to the power terminal 2B through the fuse H9.

The vehicle-mounted load controller 1 of this embodiment differs from that of the third embodiment in the configuration of the control unit 6. Other components are similar to those in the third embodiment, and therefore a description and illustration thereof will be omitted.

In the case where supplies of power to multiple loads (in this embodiment, light sources L) for different uses are started within a predetermined period in response to inputted control signals, the control unit 6 of this embodiment controls the corresponding switches 5, the converter unit 13, and the inverter unit 14 so that the supplies of power to the multiple light sources L for different uses may be performed in order with a predetermined interval of time. In other words, as in the second embodiment, the control unit 6 avoids simultaneously performing supplies of power to the multiple light sources L.

In the case where on signals for multiple light sources L are simultaneously inputted, the control unit 6 starts supplies of power to the light sources L in accordance with a preset priority sequence. For example, in this embodiment, the supply of power is started in order of the light source L2 for emitting the driving beam, the light source L1 for emitting the passing beam, the light source L3 as the width indicator, and the light source L4 as the blinker.

In the case where a high-intensity discharge lamp is used as the light source L1, in the light source L1, the magnitude of the current is small in the early stage of the supply of power after the start thereof, but the current takes a long time to stabilize at a low value, compared to those in the light sources L2 to L4 which are halogen lamps or the like. For example, in a halogen lamp, the current stabilizes in approximately 3 ms; meanwhile, in a high-intensity discharge lamp, the current takes approximately 6 to 7 s to stabilize.

For this reason, in the control unit 6 of this embodiment, the aforementioned predetermined interval of time until the start of supply of power to the next light source L is changed in accordance with the types of the light sources L. In other words, the control unit 6 has, as the aforementioned predetermined interval of time, a first predetermined interval of time corresponding to the light sources L2 to L4 which are halogen lamps and a second predetermined interval of time corresponding to the light source L1 which is a high-intensity discharge lamp. The first predetermined interval of time has a value set in consideration of the full width at half maximum of inrush current of the light sources L2 to L4, e.g., a value in the range from several milliseconds to approximately 10 milliseconds (in this embodiment, 5 ms). On the other hand, the second predetermined interval of time has a value set in consideration of the full width at half maximum of inrush current of the light source L1, e.g., a value in the range from 6 s to 7 s (in this embodiment, 6 s).

The control unit 6 further has, as the aforementioned predetermined period, a first predetermined period corresponding to the light sources L2 to L4 and a second predetermined period corresponding to the light source L1. The predetermined first period is set with reference to the times that the currents supplied to the light sources L2 to L4 take to almost stabilize, and is set to a period (less than 5 ms) shorter than the first predetermined interval of time (in this embodiment, 5 ms). Moreover, the second predetermined period is set with reference to the time that the current supplied to the light source L1 takes to almost stabilize, and is set to a period (less than 6 s) shorter than the first predetermined interval of time (in this embodiment, 6 s). It should be noted that though the first and second predetermined periods may be longer than the first and second predetermined intervals of time, respectively, the first and second predetermined periods are preferably set to periods slightly shorter than the predetermined intervals of time for the following reasons: the excessive lengthening thereof causes unnecessary delay in control, and the excessive shortening thereof causes the overlapping of the respective peaks of inrush currents in the loads.

Accordingly, after starting the supply of power to the light source L1, the control unit 6 of this embodiment starts counting the second predetermined period. In the case where an on signal for a different light source L is inputted before the second predetermined period expires, the control unit 6 performs the supply of power to the different light source L after the second predetermined interval of time has elapsed since the start of supply of power to the light source L1. In the case where an on signal for a different light source L is inputted after the second predetermined period has expired, the control unit 6 immediately starts the supply of power to the different light source L without waiting until the second predetermined interval of time elapses since the start of supply of power to the light source L1. On the other hand, after starting the supply of power to a light source L2, L3, or L4, the control unit 6 starts counting the first predetermined period. In the case where an on signal for a different light source L is inputted before the first predetermined period expires, the control unit 6 performs the supply of power to the different light source L after the first predetermined interval of time has elapsed since the start of supply of power to the preceding light source L2, L3, or L4 has been started. In the case where an on signal for a different light source L is inputted after the first predetermined period has expired, the control unit 6 immediately starts the supply of power to the different light source L without waiting until the first predetermined interval of time elapses since the start of supply of power to the preceding light source L2, L3, or L4.

Figure 19:
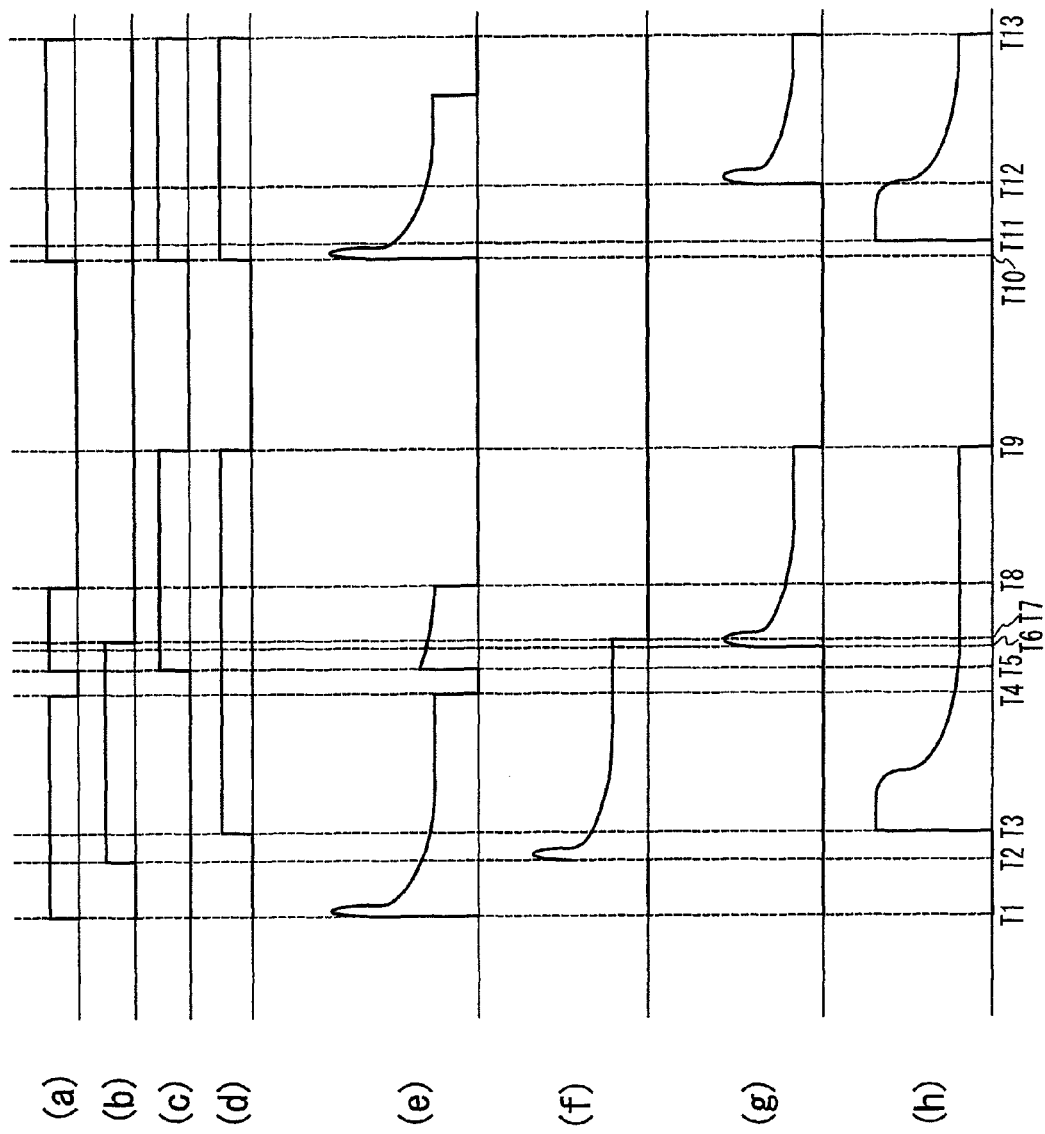
FIG. 19 is a timing chart showing the operation of a vehicle-mounted load controller of a fourth embodiment.

Next, the operation of the vehicle-mounted load controller 1 of this embodiment will be explained with reference to FIG. 19. It should be noted that part (a) of FIG. 19 shows a timing chart of a control signal (on or off signal) for the light source L2, part (b) of FIG. 19 shows that of a control signal for the light source L3, part (c) of FIG. 19 shows that of a control signal for the light source L4, and part (d) of FIG. 19 shows that of a control signal for the light source L1. Further, part (e) of FIG. 19 shows a timing chart of the consumption current of the light source L2, part (f) of FIG. 19 shows that of the consumption current of the light source L3, part (g) of FIG. 19 shows that of the consumption current of the light source L4, and part (h) of FIG. 19 shows that of the consumption current of the light source L1.

In the example shown in FIG. 19, at time T1, upon receiving an on signal for the light source L2, the control unit 6 starts the supply of power to the light source L2. After that, at time T2, upon receiving an on signal for the light source L3, the control unit 6 starts the supply of power to the light source L3. After that, at time T3, upon receiving an on signal for the light source L1, the control unit 6 starts the supply of power to the light source L1. After that, at time T4, upon receiving an off signal for the light source L2, the control unit 6 stops the supply of power to the light source L2.

After that, at time T5, upon simultaneously receiving an on signal for the light source L2 and an on signal for the light source L4, the control unit 6 first starts the supply of power to the light source L2 given higher priority. At time T6 at which the first predetermined interval of time has elapsed since the supply of power to the light source L2 has been started, the control unit 6 starts the supply of power to the light source L4.

Further, after time T6, at time T7, upon receiving an off signal for the light source L3, the control unit 6 stops the supply of power to the light source L3. After that, at time T8, upon receiving an off signal for the light source L2, the control unit 6 stops the supply of power to the light source L2. After that, at time T7, upon receiving both off signals for the light sources L1 and L4, the control unit 6 stops each of supplies of power to the light sources L1 and L4.

After that, at time T10, upon simultaneously receiving an on signal for the light source L2, an on signal for the light source L4, and an on signal for the light source L1, the control unit 6 first starts the supply of power to the light source L2 given the highest priority as described previously. Then, at time T11 at which the first predetermined interval of time has elapsed since the start of supply of power to the light source L2, the control unit 6 starts the supply of power to the light source L1 given priority which is the highest next to the light source L2. At time T12 at which the second predetermined interval of time has elapsed since the start of supply of power to the light source L1, the control unit 6 starts the supply of power to the last light source L4. After time T12, at time T13, upon simultaneously receiving an off signal for the light source L2, an off signal for the light source L4, and an off signal for the light source L1, the control unit 6 stops each of supplies of power to the light sources L2, L4, and L1.

The above-described vehicle-mounted load controller 1 of this embodiment has similar effects to those of the third embodiment. Further, in the case where the multiple light sources L are lit within a predetermined period, the multiple light sources L are lit in order. Accordingly, it is possible to prevent a blowout of the fuse H9 between the power terminal 2 and the power line S1 due to a phenomenon in which current temporarily increases in the multiple light sources within a short period in the early stage of supplies of power to the light sources L after the start thereof. Thus, multiple light sources L can be prevented from simultaneously becoming unusable.

Moreover, since the rating of the fuse H9 can be set to an appropriate value, a delay of a blowout can be prevented from occurring when a blowout of the fuse H9 is truly required, and thereby preventing serious damage to the battery, the loads, and the like.

Fifth Embodiment

Figure 21:
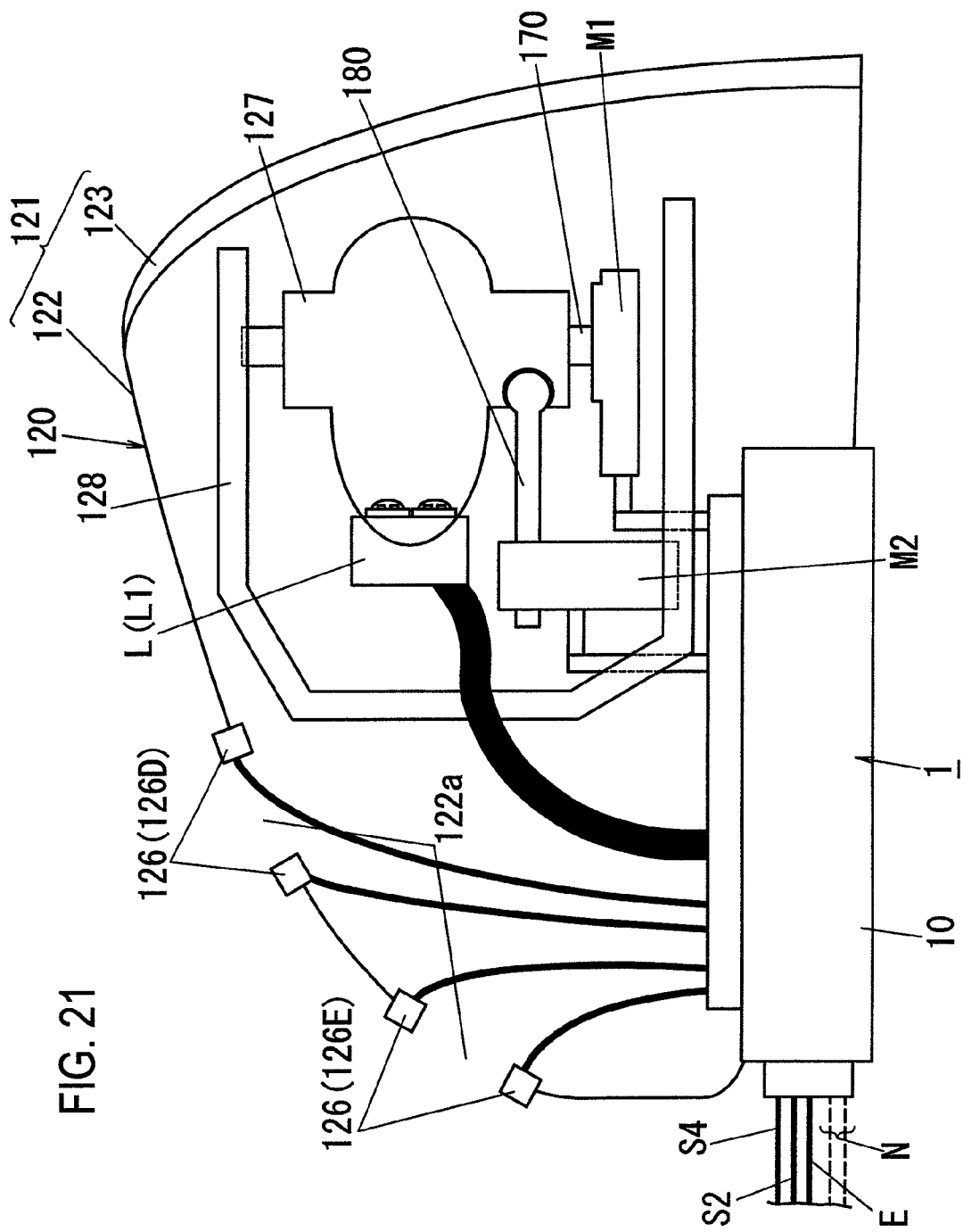
FIG. 21 is a schematic explanatory diagram of a headlight lighting device including the vehicle-mounted load controller.

A vehicle-mounted load controller 1 of this embodiment constitutes a vehicle-mounted headlight device together with a front lamp unit 120 shown in FIG. 21.

The front lamp unit 120 shown in FIG. 21 includes a box-shaped lamp casing 121 installed in a front face of the vehicle body 110 of the vehicle 100. The front lamp unit 120 further includes, as loads, a light source L1 for the passing beam, a light source L7 for cornering, a light source L8 for daytime lighting, a swivel motor M1 for turning the optical axis of the light source L1 to the left and right, and a leveling motor M2 for adjusting the vertical position of the optical axis of the light source L1.

The lamp casing 121 shown in FIG. 21 includes a housing 122 and a translucent cover 123 as in the first embodiment. On the upper-surface side of the housing 122, multiple (two in the shown example) openings 122a are formed through which the light-emitting portions 300 of the light sources L7 and L8 are inserted into the lamp casing 121, respectively. Similar to the light sources L2 to L6, the light sources L7 and L8 for use in the front lamp unit 120 shown in FIG. 21 each include a light-emitting portion (bulb) 300, a base 310, and a pair of power supply terminal portions 320. The light-emitting portion 300 includes a glass tube in which a filament is enclosed. The base 310 is provided on the base side of the light-emitting portion 300. The pair of power supply terminal portions 320 applies a voltage between the two ends of the filament in the light-emitting portion 300. However, as shown in part (a) of FIG. 17, the power supply terminal portions 320 are provided in the portion (portion of the base 310 on the light-emitting portion 300 side) of the base 310 facing the lamp casing 121 in a state in which the light-emitting portion 300 is inserted into the lamp casing 121 through the opening 122a of the lamp casing 121. It should be noted that both the light sources L7 and L8 are incandescent lamps such as halogen lamps.

Along with this, a pair of connector portions 126 is provided on a peripheral portion of each of the openings 122a of the housing 122. To each pair of connector portions 126, the pair of power supply terminal portions 320 of the corresponding one of light sources L7 and L8 having the light-emitting portion 300 inserted in the lamp casing 121 through the opening 122a is electrically connected. Each of these connector portions 126 is mechanically connected to the corresponding base 310 as well as electrically connected to the corresponding power supply terminal portion 320. It should be noted that in FIG. 21, for the sake of distinction of the multiple connector portions 126 from each other, the connector portions 126 for the light source L7 are denoted by sign 126D, and the connector portions 126 for the light source L8 are denoted by sign 126E.

In the front lamp unit 120 shown in FIG. 21, each of the light sources L7 and L8 is attached to the lamp casing 121 by inserting the light-emitting portion 300 into the lamp casing 121 through the opening 122a of the housing 122 and connecting the power supply terminal portions 320 to the connector portions 126 formed on the peripheral portion of the opening 122a as shown in FIG. 18. It should be noted that when the light source L is attached to the lamp casing 121, waterproofing is applied between the base 310 of the light source L and the opening 122a of the housing 122 with a waterproofing member such as an O ring (not shown) so as to prevent the entry of water and the like into the lamp casing 121 through the opening 122a.

On the other hand, the light source L1 in this embodiment is not a high-intensity discharge lamp such as in the third embodiment but an LED light source including a series circuit formed by connecting multiple light-emitting diodes (e.g., white light-emitting diodes) in series. This light source L1 is fixed to a reflecting plate 127 (see FIG. 21) by which the light emitted by the light source L1 is reflected ahead of the vehicle 100.

Figure 20:
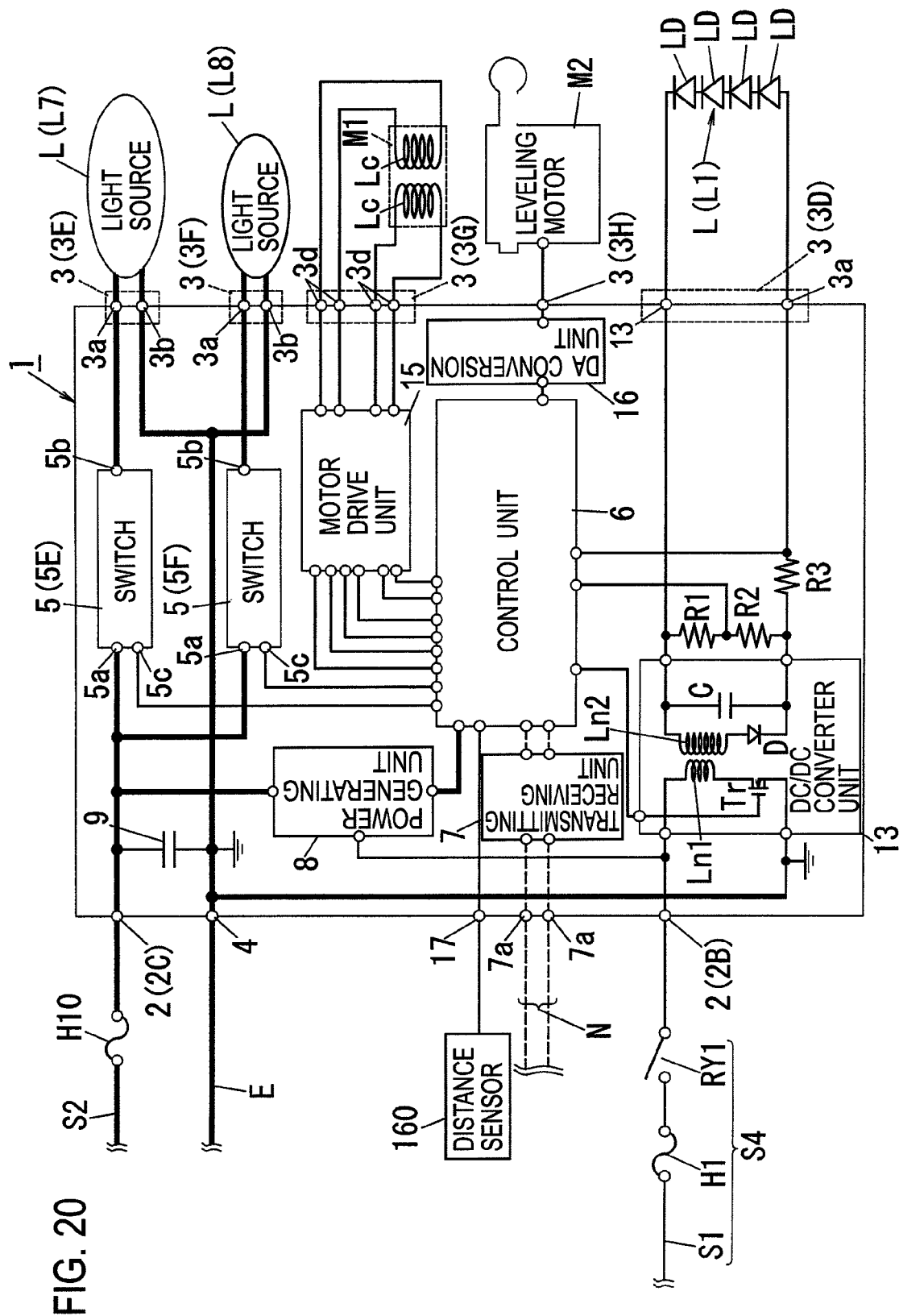
FIG. 20 is a schematic explanatory diagram of a vehicle-mounted load controller of a fifth embodiment.

The reflecting plate 127 is attached to a retainer 128 in such a way that the reflecting plate 127 can be rotated by the swivel motor M1, the retainer 128 having an opening for light emission formed on the front face side. The swivel motor M1 is, for example, as shown in FIG. 20, a so-called stepping motor (also called a pulse motor) including a rotor 170 and a device body 171. To the rotor 170, the reflecting plate 127 is fixed. The device body 171 contains a stator (not shown) for rotating the rotor 170, and a pair of drive coils Lc (see FIG. 18) wound around the stator.

Moreover, the retainer 128 is housed in the lamp casing 121 in such a way that the opening for light emission faces toward the translucent cover 123. Also, the retainer 128 is housed in the lamp casing 121 in such a way that the retainer 128 can turn about a rotation axis parallel to the right-left direction of the lamp casing 121. The retainer 128 is turned by the leveling motor M2. The leveling motor M2 is, for example, as shown in FIG. 21, formed by a DC motor including a rotor 180 and a device body 181. One end of the rotor 180 is attached to the reflecting plate 127. The device body 181 contains a stator (not shown) for rotating the rotor 180. The rotor 180 is provided such that the rotor 180 advances or retreats with respect to the device body 181 in the direction of the rotation axis by being rotated by the stator, in accordance with the rotation direction. This allows the reflecting plate 127 together with the retainer 128 to turn in accordance with the movement of the rotor 180 about a rotation axis extending in the right-to-left direction of the lamp casing 121. The leveling motor M2 further includes a detection unit (not shown) for detecting the position of the rotor 180 and a motor control unit (not shown) for causing the rotor 180 to rotate by comparing a given target value and a detection value of the detection unit and then controlling the stator so that the detection value may become equal to the target value.

As described above, the vehicle-mounted load controller 1 of this embodiment differs from the first embodiment in that loads to be controlled are the light sources L1, L7, and L8, the swivel motor M1, and the leveling motor M2 of the front lamp unit 120 shown in FIG. 21.

Along with this modification, the vehicle-mounted load controller 1 includes the power terminal 2B described in the third embodiment and a power terminal 2 (hereinafter denoted by sign 2C as needed for the sake of distinction from the power terminals 2A and 2B) connected to the power line S2 of the vehicle-mounted battery through a fuse H10 of the relay/fuse box 200, instead of the power terminal 2A. The power generating unit 8 of this embodiment is connected to both the power terminals 2B and 2C. The power generating unit 8 generates operating power for the control unit 6 from the electric power obtained from at least one of the power line S4 connected to the power terminal 2B and the power line S2 connected to the power terminal 2C, and supplies the operating power to the control unit 6. Accordingly, even if electric power is not obtained from the power line S2 due to a blowout of the fuse H10, the control unit 6 can operate by the electric power from the power line S4. On the other hand, even if electric power is not obtained from the power line S4 due to a blowout of the fuse H1, the control unit 6 can operate by the electric power from the power line S2.

Moreover, the vehicle-mounted load controller 1 includes load connecting portions 3 to which the light sources L1, L7, and L8, the swivel motor M1, and the leveling motor M2 are respectively connected, a lighting circuit unit for the light source L1, a motor drive unit 15 for the swivel motor M1, a DA conversion unit 16 for supplying the target value to the leveling motor M2, and a sensor connecting terminal 17 to which a distance sensor 160 for detecting the distance between the vehicle body 110 and a road surface is connected. It should be noted that for the sake of distinction of the multiple load connecting portions 3 from each other, the load connecting portion 3 for the light source L1 is denoted by sign 3D as in the third embodiment, the load connecting portion 3 for the light source L7 is denoted by sign 3E, the load connecting portion 3 for the light source L8 is denoted by sign 3F, the load connecting portion 3 for the swivel motor M1 is denoted by sign 3G, and the load connecting portion 3 for the leveling motor M2 is denoted by sign 3H, as needed.

Unlike in the third embodiment, the load connecting portion 3D in this embodiment includes a higher-potential connecting terminal 3a connected to the anode side of the series circuit which includes the multiple light-emitting diodes LD constituting the light source L1, and a lower-potential connecting terminal 3b connected to the cathode side of the series circuit. The higher-potential connecting terminal 3a is connected to a higher-potential output terminal of the converter unit 13. The lower-potential connecting terminal 3b is connected to a lower-potential output terminal of the converter unit 13 through the resistor R3. Accordingly, the output voltage of the converter unit 13 is applied between the two ends of the series circuit including the multiple light-emitting diodes LD and the resistor R3. The lighting circuit unit for the light source L1 in this embodiment includes the converter unit 13 and the control unit 6. The converter unit 13 in this embodiment includes a transformer including a primary winding Ln1 and a secondary winding Ln2, a switching element Tr, a diode D, and a smoothing capacitor C as in the third embodiment.

The load connecting portions 3E and 3F each has a higher-potential connecting terminal 3a and a lower-potential connecting terminal 3b as similar to the load connecting portions 3A to 3C described in the first embodiment. A switch 5 is arranged between each of the connecting terminals 3a of the load connecting portions 3E and 3F and the power terminal 2C. For the sake of distinction of the switches 5 from each other, the switch 5 corresponding to the load connecting portion 3E is denoted by sign 5E, and the switch 5 corresponding to the load connecting portion 3F is denoted by sign 5F, as needed. Each of the switches 5E and 5F is connected to the control unit 6 as in the first embodiment.

The load connecting portion 3G includes pairs of connecting terminals 3d equal to the number (two in this embodiment) of drive coils Lc. To each of the pairs of connecting terminals 3d, the two ends of a drive coil Lc are connected, respectively. This load connecting portion 3G is connected to the motor drive unit 15 and used to supply the output of the motor drive unit 15 to the swivel motor M1. The motor drive unit 15 is connected to the control unit 6, and controls the swivel motor M1 in accordance with a motor control signal supplied from the control unit 6. As the stepping motor and the motor drive unit 15, conventionally known ones can be employed, and therefore a detailed description thereof will be omitted.

The load connecting portion 3H includes a connecting terminal connected to the input terminal of the leveling motor M2. The load connecting portion 3H is connected to the output terminal of the DA conversion unit 16. The output of the DA conversion unit 16 is inputted to the leveling motor M2 through the load connecting portion 3H. The DA conversion unit 16 converts a target value signal of digital form inputted from the control unit 6 into analog form, and outputs the target value signal in analog form. It should be noted that if the leveling motor M2 can operate on the basis of a target value signal in digital form, this DA conversion unit 16 can be omitted. It should be noted that as the above-described leveling motor M2, a conventionally known one can be employed, and therefore a detailed description thereof will be omitted.

As described above, in the vehicle-mounted load controller 1 of this embodiment, loads to be controlled are the light sources L1, L7, and L8, the swivel motor M1, and the leveling motor M2. Accordingly, the vehicle information which the control unit 6 in this embodiment needs includes a control signal (on or off signal for the light source L1) for turning on or off the passing beam, a control signal (on or off signal for the light source L7) for turning on or off a cornering lamp, a control signal (on or off signal for the light source L8) for turning on or off a daytime running lamp, and vehicle steering information for use in driving the swivel motor M1. The transmitting/receiving unit 7 of this embodiment obtains the on/off signal for each of the light sources L1, L7, and L8 and the steering information from the in-vehicle network, and outputs these signals and the steering information to the control unit 6. Moreover, to the control unit 6, the sensor connecting terminal 17 is connected. Connecting the distance sensor 160 to the sensor connecting terminal 17 causes the detection output of the distance sensor 160 to be inputted to the control unit 6. This detection output is used to supply the target value to the leveling motor M2.

The control unit 6 in this embodiment has a first control function to control the lighting of the light source L1, a second control function to control the lighting of each of the light sources L7 and L8, a third control function to control the operation of the swivel motor M1, and a fourth control function to control the operation of the leveling motor M2.

The first control function is the function in which, upon receiving an on signal for the light source L1 through the transmitting/receiving unit 7, the control unit 6 monitors the DC voltage outputted by the converter unit 13 through the voltage divider including the resistors R1 to R3 to control the switching element Tr of the converter unit 13 so that the DC voltage may have a desired value (value which allows the lighting of the light source L1), and, on the other hand, upon receiving an off signal for the light source L1, the control unit 6 stops the operation of the converter unit 13 to extinguish the light source L1.

The second control function is the function in which the control unit 6 outputs a switching control signal for on to the switch 5E upon receiving an on signal for the light source L7, outputs a switching control signal for off to the switch 5E upon receiving an off signal for the light source L7, outputs a switching control signal for on to the switch 5F upon receiving an on signal for the light source L8, and outputs a switching control signal for off to the switch 5F upon receiving an off signal for the light source L8. It should be noted that as in the second embodiment, in the case where supplies of power to multiple light sources L are started within a predetermined period in response to inputted control signals, the switches 5 may be controlled so that the timings of starting the supplies of power to the multiple light sources L may be shifted from each other by a predetermined interval of time longer than the predetermined period.

The third control function is the function in which the control unit 6 outputs, upon receiving the steering information, a motor control signal on the basis of the steering direction of the steering information to the motor drive unit 15. The fourth control function is the function in which the control unit 6 calculates a target value in accordance with the detection output of the distance sensor 160, and outputs a target value signal in digital form to the DA conversion unit 16.

In this way, the control unit 6 in this embodiment controls each of the light sources L1, L7, and L8, the swivel motor M1, and the leveling motor M2.

In the above-described vehicle-mounted load controller 1 of this embodiment, the load connecting portions 3E and 3F for the multiple loads for different uses are connected to one power terminal 2 connected to the power line S2 of the vehicle-mounted battery through the fuse H10. This enables the miniaturization and cost reduction of the relay/fuse box 200. Accordingly, there is no difficulty in disposing the relay/fuse box 200. Further, the entire size of the vehicle 100 can be made smaller than heretofore. Thus, for example, it becomes possible to provide a vehicle having improved riding comfort by increasing the cabin space of the vehicle 100. Besides, when the magnitude of the current flowing through a light source L reaches or exceeds a predetermined value, the switch 5 stops the supply of power from the power line S1 to the light source L. This can prevent a blowout of the fuse H10 between the power terminal 2 and the power line S2. Accordingly, it is possible to prevent a blowout of the fuse H10 from simultaneously stopping supplies of power to the light sources L7 and L8, the swivel motor M1, and the leveling motor M2 connected to the multiple load connecting portions 3E to 3H connected to the power terminal 2, and therefore to prevent the multiple loads for different uses from simultaneously becoming unusable.

Besides, the vehicle-mounted load controller 1 of this embodiment includes the power terminal 2B connected to the power line S4 to serve as a power terminal for the passing beam, and the power terminal 2C connected to the power line S2 to serve as a power terminal for the ignition; and further includes the load connecting portion 3D to which the light source L1 is connected and which serves as a load connecting portion for the passing beam, and the multiple load connecting portions 3E and 3F to which the light sources L7 and L8 allowed to emit light when the ignition is on are connected and which serve as load connecting portions activated when the ignition is on. To the power terminal 2B, the load connecting portion 3D is electrically connected through the lighting circuit unit. To the power terminal 2C, the multiple load connecting portions 3E and 3F are electrically connected to which the multiple light sources L7 and L8 for different uses are respectively connected.

Accordingly, in the vehicle-mounted load controller 1 of this embodiment, the light source L1 for the passing beam can be allowed to emit light by a user performing an operation for turning on the passing beam, whereas light sources L, i.e., the light source L7 for cornering and the light source L8 for daytime lighting, except the light source L1 for the passing beam can be allowed to emit light by a user performing an operation for turning on the ignition.

Further, the vehicle-mounted load controller 1 includes the multiple load connecting portions 3 respectively corresponding to all the loads (light sources L1, L7, and L8, swivel motor M1, and leveling motor M2) provided in the front lamp unit 120. Accordingly, all the multiple loads provided in the front lamp unit 120 can be controlled. This eliminates the necessity of additionally installing a controller or the like for each load in the front lamp unit 120, and enables a reduction in the number of connecting lines and the like and a simplification of the overall configuration, thus enabling the miniaturization and cost reduction of the front lamp unit 120.

Moreover, controlling all the loads in the lamp casing 121 with the vehicle-mounted load controller 1 as described above eliminates the necessity of providing current supply wiring outside the lamp casing 121. In particular, there are many complicated and high-temperature components, such as the engine, in the vicinity of the lamp casing 121 of the front lamp unit 120. Accordingly, by placing the wiring to the loads entirely within the lamp casing 121, the wirings are prevented from contacting the complicated and high-temperature components. This can improve safety. Moreover, the power terminals 2 and the like of the vehicle-mounted load controller 1 are located outside the lamp casing 121. This eliminates the necessity of providing a connector in the lamp casing 121 itself. Accordingly, the shape of the lamp casing 121 can be made a relatively simple shape. Thus, the miniaturization and cost reduction of the front lamp unit 120 can be achieved.

Moreover, the vehicle-mounted load controller 1 of this embodiment includes, as power terminals 2, the power terminal 2B connected to the power line S4 to serve as a power terminal for the passing beam, and the power terminal 2C connected to the power line S2 to serve as a power terminal for the ignition, but does not include the power terminal 2A connected to the power line S1. Accordingly, dark current can be reduced to 0 mA. Thus, there is no need to consider issues such as the reduction of dark current unlike in the case of including the power terminal 2A. This facilitates the fabrication of the vehicle-mounted load controller 1.

As shown in FIG. 21, the enclosure 10 of the vehicle-mounted load controller 1 of this embodiment described above is attached to the lower-surface side of the lamp casing 121 in such a way that the power terminals 2, the grounding terminal 4, the sensor connecting terminal 17, and the transmission line connecting terminals 7a are exposed outside the lamp casing 121 and that all the load connecting portions 3 are located inside the lamp casing 121. Further, in the lamp casing 121, the load connecting portion 3D is connected to the light source L1, the load connecting portion 3E is electrically connected to connector portions 126D corresponding to the light source L7, the load connecting portion 3F is electrically connected to connector portions 126E corresponding to the light source L8, the load connecting portion 3G is connected to the swivel motor M1, and the load connecting portion 3H is connected to the leveling motor M2. On the other hand, connection to the power lines S2 and S4, the grounding line E, the transmission lines N, and the distance sensor 160 is performed outside the lamp casing 121. It should be noted that in FIG. 21, the fuses H1 and H10 and the relay RY1 are not shown.

In the above-described vehicle-mounted headlight device, the power terminals 2 are located outside the lamp casing 121. This eliminates the necessity of drawing connecting lines (e.g., harness) for connecting the power lines S2 and S4 to the power terminals 2 into the lamp casing 121, and therefore eliminates the necessity of waterproofing of the lamp casing 121 which would be needed in the case where the connecting lines are drawn into the lamp casing 121. Moreover, the load connecting portions 3 are located inside the lamp casing 121. Accordingly, there is no need to use waterproof connectors or the like for the load connecting portions 3. Besides, the light sources L can be connected to the load connecting portions 3 within the lamp casing 121. Further, cable runs between the light sources L and the load connecting portions 3 can be made shorter. Thus, the noise can be reduced. Moreover, the light sources L can be connected to the load connecting portions 3 of the vehicle-mounted load controller 1 by attaching the light sources L to the lamp casing 121. This facilitates work such as the replacement of a light source L. Besides, the light sources L can be connected to the load connecting portions 3 within the lamp casing 121. Further, cable runs between the light sources L and the load connecting portions 3 can be made shorter than in the case (see FIG. 7) where the enclosure 10 is located outside the lamp casing 121 as in the first embodiment. This shortens current loops for the current flowing through the light sources L. Thus, the noise can be reduced.

It should be noted that loads to be controlled by the vehicle-mounted load controller 1 are not limited to those in the above-described example, and may only include, for example, the light sources L1 and L7 and the leveling motor M2. These are operated when the light source L1 is on. Accordingly, in this case, supplies of power to the light sources L1 and L7 and the leveling motor M2 may be performed through the power line S4 (i.e., only the power terminal 2B is provided). This eliminates the necessity of connecting lines and the like to the power line S2 and the power terminal 2C all around. As a result, the number of connecting lines to power lines can be reduced.

Moreover, the multiple power terminals 2 in this embodiment are not limited to a combination of the power terminal 2B serving as the power terminal for the passing beam and the power terminal 2C serving as the power terminal for an full time power terminal, and need only to include the power terminal for the passing beam and the power terminal for the full time power terminal. Other than these, a power terminal 2A connected to the power line S1 or a power terminal 2 connected to the power line S3 may also be provided. Moreover, instead of the power terminal for the passing beam, a power terminal 2C connected to the power line S2 or a power terminal 2 connected to the power line S3 may be used. In short, the multiple power terminals 2 need only to include a power terminal 2 connected to a power line through which the supply of power from the vehicle-mounted battery is started or stopped when a user performs a predetermined operation (e.g., an operation for turning on the passing beam, an operation for turning on the ignition, or the like). This enables a user to select a light source L to be allowed to emit light among the multiple light sources L for different uses by performing a predetermined operation.

Further, the multiple load connecting portions 3 are not limited to a combination of the load connecting portion 3D serving as the load connecting portion for the passing beam and the multiple load connecting portions 3E and 3F serving as the load connecting portions activated when the ignition is on, and need only to include the load connecting portion for the passing beam and the load connecting portions activated when the ignition is on.

Sixth Embodiment

Figure 23:
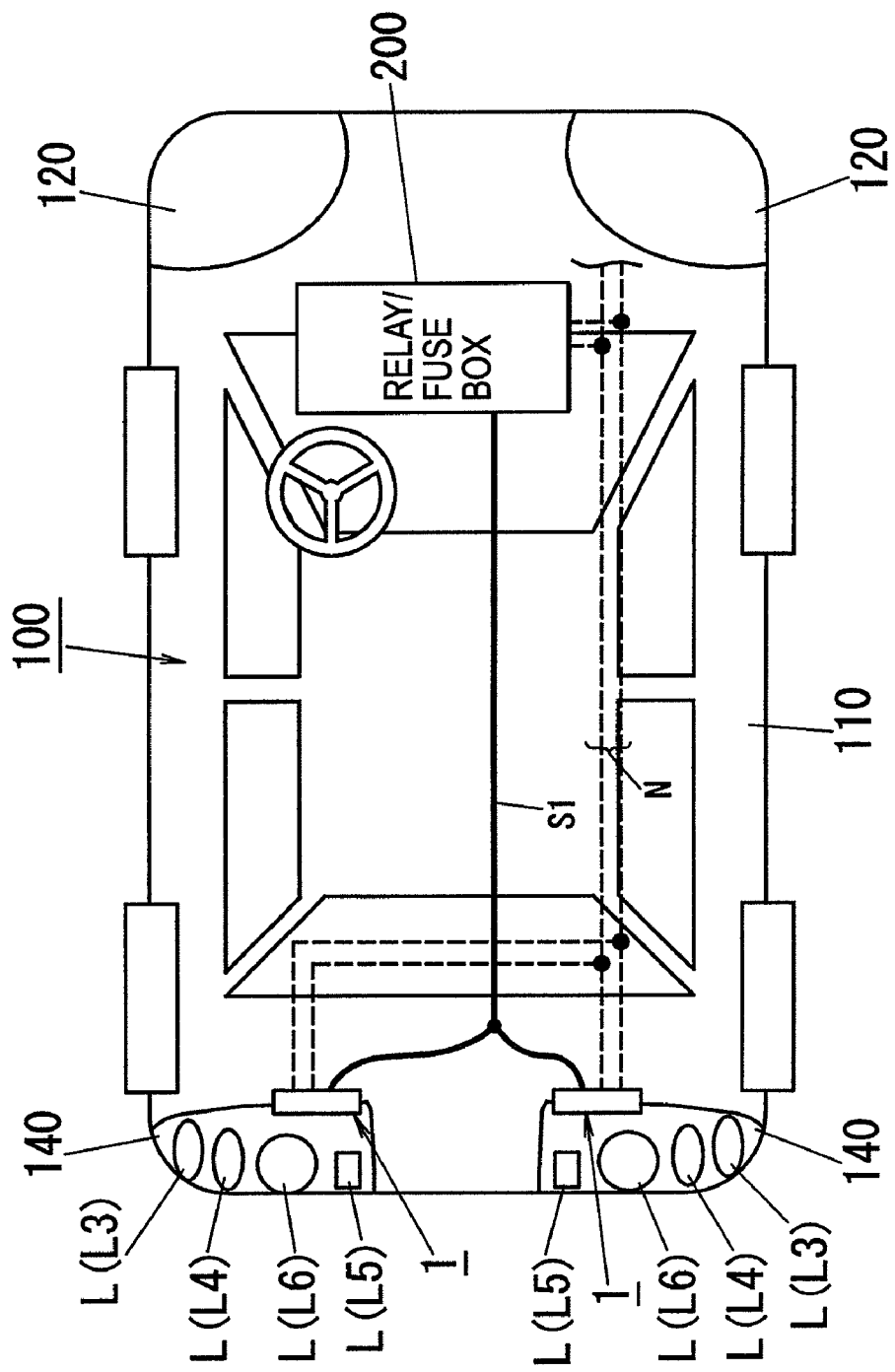
FIG. 23 is an explanatory diagram showing an example of use of the vehicle-mounted load controller.

A vehicle-mounted load controller 1 of this embodiment is used as a vehicle-mounted light source controller for controlling the lighting of loads including light sources L3 to L6 provided in the rear lamp unit 140 which is a vehicle-mounted lamp fitting of the vehicle 100 as shown in FIG. 23. The vehicle-mounted load controller 1, together with the rear lamp unit 140, constitutes a vehicle-mounted taillight device. It should be noted that the vehicle-mounted taillight device includes a light source L3 for a width indicator and a light source L4 for a blinker in addition to a light source L6 for a taillight, and is used for purposes other than a taillight. But, in this embodiment, it is referred to as a vehicle-mounted taillight device since the device includes the light source L6 for the taillight. Moreover, components of the vehicle 100 which are similar to those of the conventional example shown in FIG. 1 will be denoted by the same signs, and a description thereof will be omitted.

The rear lamp unit 140 includes a box-shaped lamp casing 141 installed in a rear face of the vehicle body 110 of the vehicle 100, and the multiple light sources L3 to L6 attached to the lamp casing 141.

Figure 24:
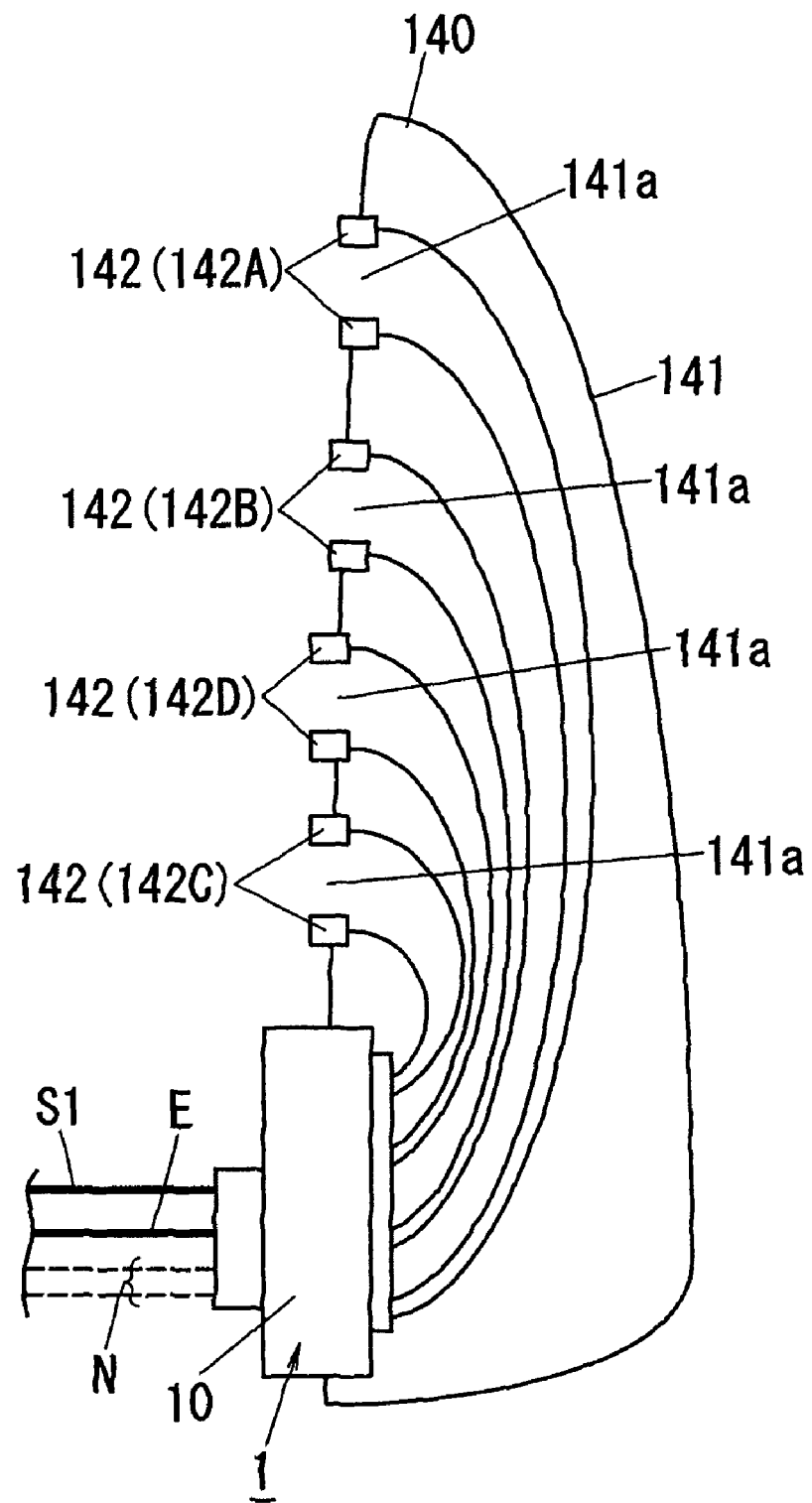
FIG. 24 is a schematic explanatory diagram of a vehicle-mounted taillight device including the vehicle-mounted load controller.

As shown in FIG. 24, one side of the lamp casing 141 is formed of translucent material. On the other side of the lamp casing 141, multiple (four in the shown example) openings 141a are formed through which the light-emitting portions 300 of the light sources L3 to L6 are inserted into the lamp casing 141.

The light sources L3 to L6 for use in the rear lamp unit 140 each include a light-emitting portion (bulb) 300, a base 310, and a pair of power supply terminal portions 320. The light-emitting portion 300 includes a glass tube. The base 310 is provided on the base side of the light-emitting portion 300. The pair of power supply terminal portions 320 is intended to apply a voltage between the two ends of the filament in the light-emitting portion 300. However, as shown in part (a) of FIG. 17, the power supply terminal portions 320 are provided in the portion (portion of the base 310 on the light-emitting portion 300 side) of the base 310 facing the lamp casing 141 in a state where the light-emitting portion 300 is inserted into the lamp casing 141 through the opening 141a of the lamp casing 141. It should be noted that all the light sources L3 to L6 are incandescent lamps such as halogen lamps.

Along with this, a pair of connector portions 142 is provided on a peripheral portion of each of the openings 141a of the lamp casing 141. To each pair of connector portions 142, the pair of power supply terminal portions 320 of the corresponding one of the light sources L3, L4, L5, and L6 having the light-emitting portion 300 inserted in the lamp casing 141 through the opening 141a are electrically connected. Each of these connector portions 142 is mechanically connected to the corresponding base 310 as well as electrically connected to the corresponding power supply terminal portion 320. It should be noted that in FIG. 24, for the sake of distinction of the multiple connector portions 142 from each other, the connector portions 142 for the light source L3 are denoted by sign 142A, the connector portions 142 for the light source L4 are denoted by sign 142B, the connector portions 142 for the light source L5 are denoted by sign 142C, and the connector portions 142 for the light source L6 are denoted by sign 142D.

In the rear lamp unit 140 shown in FIG. 23, each of the light sources L4 to L6 is attached to the lamp casing 141 by inserting the light-emitting portion 300 into the lamp casing 141 through the opening 141a and connecting the power supply terminal portions 320 to the connector portions 142 formed on the peripheral portion of the opening 141a. It should be noted that when each of these light sources L is attached to the lamp casing 141, waterproofing is applied between the base 310 of the light source L and the opening 141a of the lamp casing 141 with a waterproofing member such as an O ring (not shown) so as to prevent the entry of water and the like into the lamp casing 141 through the opening 141a.

Figure 22:
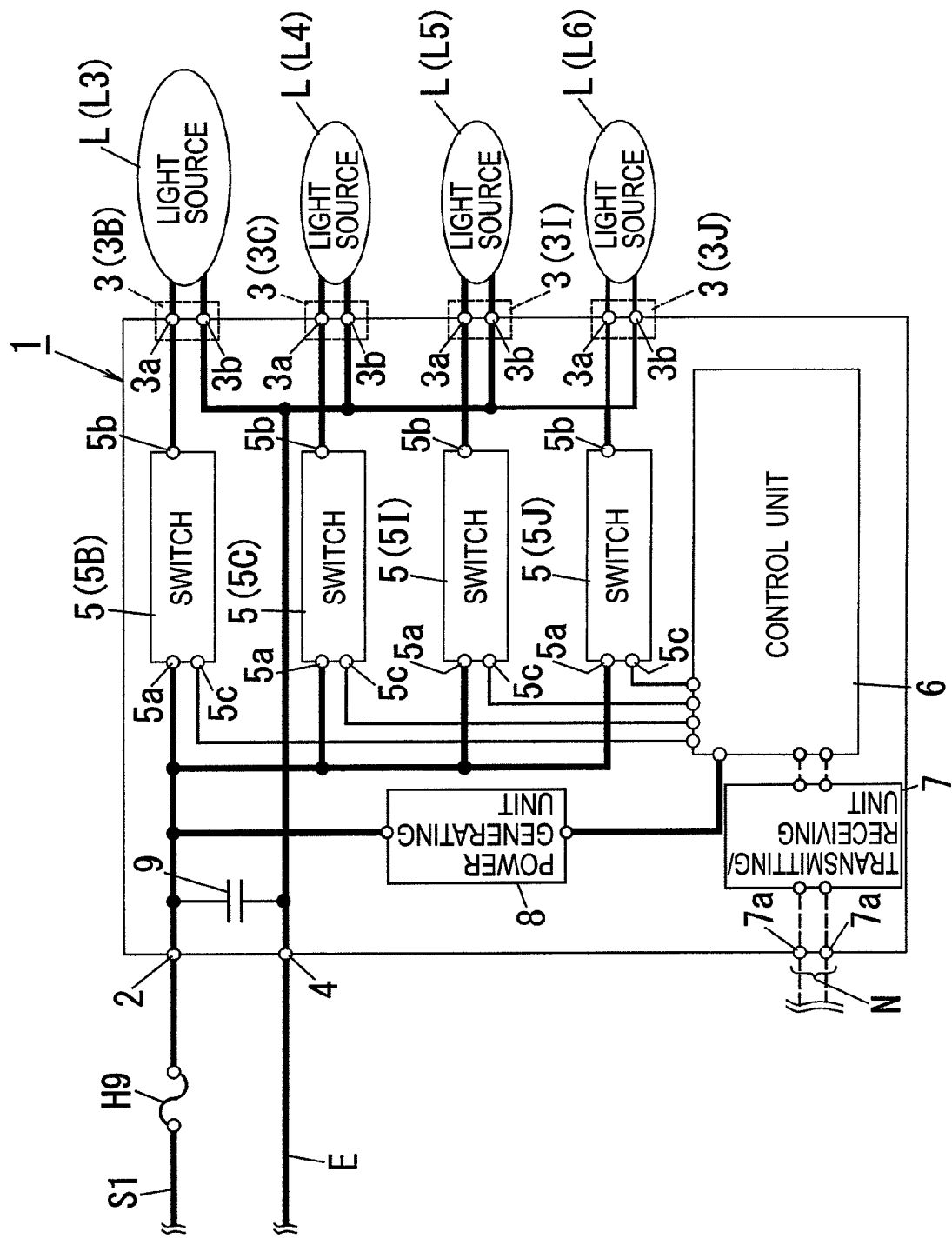
FIG. 22 is a schematic explanatory diagram of a vehicle-mounted load controller of a sixth embodiment.

As shown in FIG. 22, the vehicle-mounted load controller 1 includes a power terminal 2, multiple (four in the shown example) load connecting portions 3, a grounding terminal 4, switches 5, a control unit 6, a transmitting/receiving unit 7, a power generating unit 8, and a smoothing circuit 9. The power terminal 2 is connected to a power line S1 of the vehicle-mounted battery through a fuse H11 of a relay/fuse box 200.

To the multiple load connecting portions 3, the multiple (four in the shown example) vehicle-mounted light sources L3 to L6 are connected, respectively. To the grounding terminal 4, a grounding line E is connected which is connected to the unillustrated lower-potential terminal (negative terminal) of the battery. The switches 5 are provided to correspond to the load connecting portions 3, respectively, and start and stop supplies of power from the power line S1 connected to the power terminal 2 to the light sources L connected to the load connecting portions 3. The control unit 6 controls the switches 5 in response to inputted control signals. The transmitting/receiving unit 7 includes a transceiver for the in-vehicle network. The power generating unit 8 supplies power to the control unit 6. The smoothing circuit 9 is connected between the power terminal 2 and the grounding terminal 4.

It should be noted that in the following description, for the sake of distinction of the multiple load connecting portions 3 from each other, the load connecting portion 3 to which the light source L3 is connected is denoted by sign 3B as in the first embodiment, the load connecting portion 3 to which the light source L4 is connected is denoted by sign 3C as in the first embodiment, the load connecting portion 3 to which the light source L5 is connected is denoted by sign 3I, and the load connecting portion 3 to which the light source L6 is connected is denoted by sign 3J, as needed. Moreover, for the sake of distinction of the switches 5 from each other, the switch 5 corresponding to the load connecting portion 3B is denoted by sign 5B as in the first embodiment, the switch 5 corresponding to the load connecting portion 3C is denoted by sign 5C as in the first embodiment, the switch 5 corresponding to the load connecting portion 3I is denoted by sign 5I, and the switch 5 corresponding to the load connecting portion 3J is denoted by sign 5J, as needed. It should be noted that the load connecting portions 3B, 3C, 3I, and 3J are similar to the load connecting portions 3 of the first embodiment, and the switches 5B, 5C, and 5I are similar to the switches 5 of the first embodiment. Accordingly, a description thereof will be omitted. Moreover, the power generating unit 8 and the smoothing circuit 9 are similar to those of the first embodiment, and therefore will be denoted by the same signs. Also, a description thereof will be omitted.

As described previously, the light source L6 is used as a taillight (tail lamp) or a stop light (also called a brake light or a brake lamp) by changing the intensity. Accordingly, the switch 5J corresponding to the light source L6 is configured so that the light source L6 can be lit at two intensities. For example, upon receiving an undermentioned switching control signal of the control unit 6 for turning on the taillight, the switching control unit 52 of the switch 5J turns on the semiconductor switch element 50 to start the supply of power to the light source L6, and, upon receiving an undermentioned switching control signal for turning off the taillight, turns off the semiconductor switch element 50 to stop the supply of power to the light source L6. On the other hand, upon receiving an undermentioned switching control signal of the control unit 6 for turning on the stop light, the switching control unit 52 of the switch 5J turns on the semiconductor switch element 50 to start the supply of power to the light source L6 as in the case where the switching control signal for turning on the taillight is inputted. At this time, the switching control unit 52 causes a larger current to flow through the light source L6 than in the case of receiving the switching control signal for turning on the taillight. Accordingly, the light source L6 lights brighter. It should be noted that, upon receiving an undermentioned switching control signal of the control unit 6 for turning off the stop light, the switching control unit 52 of the switch 5J turns off the semiconductor switch element 50 to stop the supply of power to the light source L6 as in the case where the switching control signal for turning off the taillight is inputted.

In the vehicle-mounted load controller 1 of this embodiment, loads to be controlled are the light sources L3 to L6. Accordingly, the vehicle information which the control unit 6 of this embodiment needs includes a control signal (on or off signal for the light source L3) for turning on or off the width indicator, a control signal (on or off signal for the light source L4) for turning on or off the blinker, and a control signal (on or off signal for the light source L5) for turning on or off a backup lamp. Moreover, as described above, the light source L6 is used as the taillight or the stop light by changing the intensity. Accordingly, the control unit 6 also needs a control signal (taillight-on or -off signal for the light source L6) for turning on or off the taillight, and a control signal (stop-light-on or -off signal for the light source L6) for turning on or off the brake light.

Accordingly, the transmitting/receiving unit 7 of this embodiment obtains an on/off signal for each of the light sources L3 to L6 from the in-vehicle network, and outputs these signals to the control unit 6.

Figure 2:
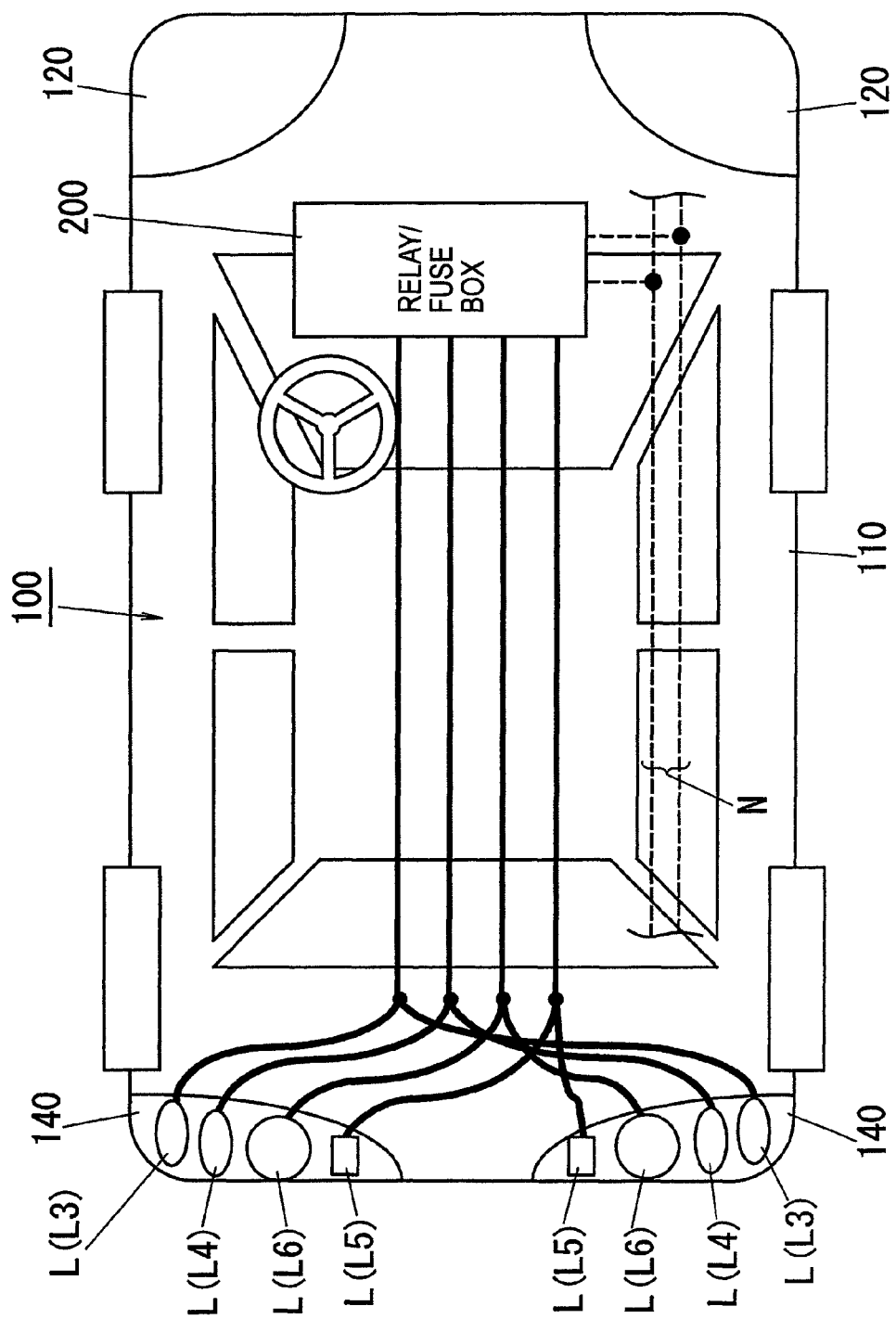
FIG. 2 is a schematic explanatory diagram of the vehicle of the conventional example.

Further, the control unit 6 in this embodiment outputs a switching control signal for on to the switch 5I upon receiving an on signal for the light source L5, and outputs a switching control signal for off to the switch 5I upon receiving an off signal for the light source L5. Moreover, the control unit 6 outputs the aforementioned switching control signal for turning on the taillight to the switch 5J upon receiving a taillight-on signal for the light source L6; outputs the aforementioned switching control signal for turning off the taillight to the switch 5J upon receiving a taillight-off signal for the light source L6; outputs the aforementioned switching control signal for turning on the stop light to the switch 5J upon receiving a stop-light-on signal for the light source L6; and outputs the aforementioned switching control signal for turning off the stop light to the switch 5J upon receiving a stop-light-off signal for the light source L6. It should be noted that as in the aforementioned second embodiment, in the case where supplies of power to multiple light sources L are started within a predetermined period in response to inputted control signals, the switches 5 may be controlled so that the timings of starting the supplies of power to the multiple light sources L may be varied from each other by a predetermined interval of time longer than the predetermined period. In the above-described vehicle-mounted load controller 1 of this embodiment, the multiple load connecting portions 3 for the multiple light sources L3 to L6 for different uses are connected to one power terminal 2 connected to the power line S1 of the vehicle-mounted battery through the fuse H11. Accordingly, unlike in the conventional example shown in FIG. 2, it is unnecessary to connect the multiple light sources L2 to L4 for different uses to the power line S1 through fuses (not shown), respectively. This enables the miniaturization and cost reduction of the relay/fuse box 200. Accordingly, there is no difficulty in disposing the relay/fuse box 200. Further, the entire size of the vehicle 100 can be made smaller than heretofore. Thus, for example, it becomes possible to provide a vehicle having improved riding comfort by increasing the cabin space of the vehicle 100.

Besides, when the magnitude of the current flowing through a light source L reaches or exceeds a predetermined value, the switch 5 stops the supply of power from the power line S1 to the light source L. This can prevent a blowout of the fuse H11 between the power terminal 2 and the power line S1. Accordingly, it is possible to prevent a blowout of the fuse H11 from simultaneously stopping supplies of power to the light sources L3 to L6 connected to the multiple load connecting portions 3B, 3C, 3I, and 3J connected to the power terminal 2, and therefore to prevent the multiple light sources L3 to L6 for different uses from simultaneously becoming unusable.

Moreover, since the multiple load connecting portions 3 of the vehicle-mounted load controller 1 include the load connecting portion 3 to which the light source L6 for the taillight is connected, the taillight can be lit and extinguished. Further, the vehicle-mounted load controller 1 includes the multiple load connecting portions 3 respectively corresponding to all the loads (light sources L3 to L6) provided in the rear lamp unit 140. Accordingly, not only the light source L6 for the taillight but all the multiple loads provided in the rear lamp unit 140 can be controlled. This eliminates the necessity of additionally installing a controller or the like for each load in the rear lamp unit 140, and enables a reduction in the number of connecting lines and the like and a simplification of the overall configuration, thus enabling the miniaturization and cost reduction of the rear lamp unit 140.

Moreover, controlling all the loads in the lamp casing 141 with the vehicle-mounted load controller 1 as described above eliminates the necessity of providing current supply wiring outside the lamp casing 141. Moreover, the power terminals 2 and the like of the vehicle-mounted load controller 1 are located outside the lamp casing 141. This eliminates the necessity of providing a connector in the lamp casing 141 itself. Accordingly, the shape of the lamp casing 141 can be made a relatively simple shape. Thus, the miniaturization and cost reduction of the rear lamp unit 140 can be achieved.

Moreover, as shown in FIG. 24, the vehicle-mounted load controller 1 includes an enclosure 10 which contains the power terminal 2, the load connecting portions 3, the grounding terminal 4, the switches 5, the control unit 6, the transmitting/receiving unit 7, the power generating unit 8, and the smoothing circuit 9. Further, the enclosure 10 of the vehicle-mounted load controller 1 is attached to the aforementioned other side of the lamp casing 141 in such a way that the power terminals 2, the grounding terminal 4, and the transmission line connecting terminals 7a are exposed outside the lamp casing 141 and that all the load connecting portions 3 are exposed inside the lamp casing 141. The load connecting portion 3B is electrically connected to the connector portion 142A corresponding to the light source L3. The load connecting portion 3C is electrically connected to the connector portion 142B corresponding to the light source L4. The load connecting portion 3I is electrically connected to the connector portion 142C corresponding to the light source L5. The load connecting portion 3J is electrically connected to the connector portion 142D corresponding to the light source L6. Thus, the vehicle-mounted taillight device shown in FIG. 24 is obtained. It should be noted that in FIG. 22, the fuse H9 is not shown.

In the above-described vehicle-mounted taillight device, the power terminals 2A and 2B are located outside the lamp casing 121. This eliminates the necessity of drawing connecting lines for connecting the power lines S1 and S4 to the power terminals 2A and 2B into the lamp casing 121, and therefore eliminates the necessity of waterproofing of the lamp casing which would be needed in the case where the connecting lines are drawn into the lamp casing 141. Moreover, the light sources L can be connected to the load connecting portions 3 by attaching the light sources L to the lamp casing 141. Accordingly, the connecting of the light sources L to the load connecting portions 3 and the attaching of the light sources L to the lamp casing 141 can be simultaneously performed. This simplifies assembly work, and facilitates work such as the replacement of a light source L.

Further, the vehicle-mounted taillight device in this embodiment is configured of: the rear lamp unit 140 which is a vehicle-mounted lamp fitting including the box-shaped lamp casing 141 installed in a rear face of the vehicle body 110 of the vehicle 100 and multiple loads (light sources L3 to L6) including at least the light source L6 for the taillight attached to the lamp casing 14; and the vehicle-mounted load controller 1 of this embodiment which serves as a taillight controller. This enables the miniaturization and cost reduction of the relay/fuse box, and makes it possible to prevent the multiple light sources L from simultaneously becoming unusable.

It should be noted that though the rear lamp unit 140 in this embodiment includes the light sources L3 and L4 as loads, this is not intended to limit loads of the rear lamp unit 140 to these. Moreover, though the enclosure 10 is attached to the rear-surface side of the lamp casing 141 in the example shown in FIG. 24, this is not intended to limit the attached position of the enclosure 10 to the rear-surface side of the lamp casing 141. The attached position of the enclosure 10 may also be a position adjacent to the upper or lower surface of the lamp casing 141. Further, the configuration of the rear lamp unit 140 is not limited to that of the example shown in FIG. 24, and may also be configurations similar to those of the front lamp units 120 shown in FIGS. 7, 8, and 12 to 14, respectively.

INDUSTRIAL APPLICABILITY

The present invention enables the miniaturization of a relay/fuse box, and also makes it possible to prevent multiple loads from simultaneously becoming unusable.

The invention claimed is:

1. A vehicle-mounted load controller comprising:
one or more power terminals connected to one or more power lines of a vehicle-mounted DC power supply through a fuse, respectively;
a plurality of load connecting portions connected to a plurality of vehicle-mounted loads, respectively;
switches configured to correspond to the plurality of load connecting portions, respectively, each of the switches starting and stopping supply of power from the power line connected to one of the one or more power terminals to one of the vehicle-mounted loads connected to the corresponding load connecting portion; and
a control unit configured to control the switches in response to inputted control signals, wherein
two or more of the plurality of load connecting portions are electrically connected to at least one of the one or more power terminals, and
each of the switches stops the supply of power from the power line to the load connected to the corresponding load connecting portion when magnitude of current flowing through the load connected to the corresponding load connecting portion reaches or exceeds a predetermined value.

2. The vehicle-mounted load controller according to claim 1, further comprising:
a smoothing capacitor connected in parallel with series circuits each including the load connected to one of the load connecting portions and the switch corresponding to the one load connecting portion, the smoothing capacitor smoothing voltage between two ends of each of the series circuits.

3. The vehicle-mounted load controller according to claim 1,
wherein the power terminals include a power terminal connected to the power line for which the supply of power from the vehicle-mounted DC power supply is started or stopped when a predetermined operation is performed by a user.

4. The vehicle-mounted load controller according to claim 3, wherein the power terminals include:
a passing-beam power terminal connected to the power line for which the supply of power from the vehicle-mounted DC power supply is started when an operation for turning on a passing beam of a vehicle is performed by a user, and is stopped when an operation for turning off the passing beam is performed by a user; and
an ignition power terminal connected to the power line for which the supply of power from the vehicle-mounted DC power supply is started when an operation for turning on an ignition is performed by a user, and is stopped when an operation for turning off the ignition is performed by a user,
the plurality of load connecting portions include:
a passing-beam load connecting portion to which a load having a light source for the passing beam is connected; and
a plurality of ignition-on load connecting portions to which loads each having a light source allowed to emit light when the ignition is on are connected, and
the plurality of ignition-on load connecting portions to which a plurality of light sources for different uses are respectively connected are electrically connected to the ignition power terminal.

5. The vehicle-mounted load controller according to claim 4, wherein the plurality of ignition-on load connecting portions include:
a load connecting portion to which a light source for daytime lighting is connected; and
a load connecting portion to which a light source for cornering is connected.

6. The vehicle-mounted load controller according to claim 3, wherein the power terminals include:
a passing-beam power terminal connected to the power line for which the supply of power from the vehicle-mounted DC power supply is started when an operation for turning on a passing beam of a vehicle is performed by a user, and is stopped when an operation for turning off the passing beam is performed by a user; and
a full time power terminal connected to the power line to which power is always supplied from the vehicle-mounted DC power supply,
the plurality of load connecting portions include:
a passing-beam load connecting portion to which a load having a light source for the passing beam is connected; and
a plurality of full time load connecting portions to which loads each having a light source always allowed to emit light are connected, and
the plurality of full time load connecting portions to which a plurality of light sources for different uses are respectively connected are electrically connected to the full time power terminal.

7. The vehicle-mounted load controller according to claim 6, wherein the plurality of full time load connecting portions include:
a load connecting portion to which a light source for a blinker is connected;
a load connecting portion to which a light source for a driving beam is connected;

a load connecting portion to which a light source for a width indicator is connected;

a load connecting portion to which a light source for daytime lighting is connected; and a load connecting portion to which a light source for cornering is connected.

8. The vehicle-mounted load controller according to claim 1, wherein, when supplies of power to the loads for different uses are started within a predetermined period in response to inputted control signals, the control unit controls the corresponding switches so that the supplies of power to the loads for different uses are performed one by one with a predetermined time interval.

9. The vehicle-mounted load controller according to claim 1, wherein the vehicle-mounted load controller is for use in a vehicle-mounted lamp fitting including:

a box-shaped lamp casing installed in a vehicle; and a plurality of loads each having a light source, the loads being attached to the lamp casing so that the loads are located entirely within the lamp casing, and the vehicle-mounted load controller further comprising an enclosure containing at least the one or more power terminals, the load connecting portions, the switches, and the control unit, wherein the enclosure is attached to the lamp casing so that the one or more power terminals are exposed outside the lamp casing and the load connecting portions are exposed inside the lamp casing.

10. The vehicle-mounted load controller according to claim 1, wherein the vehicle-mounted load controller is for use in a vehicle-mounted lamp fitting including:

a box-shaped lamp casing installed in a vehicle; and a plurality of loads each having a light source including a light-emitting portion and a power supply terminal portion, the loads being attached to the lamp casing so that the light-emitting portions are located inside the lamp casing and the power supply terminal portions are located outside the lamp casing, and the vehicle-mounted load controller further comprising an enclosure containing at least the one or more power terminals, the load connecting portions, the switches, and the control unit, wherein the enclosure is attached to the lamp casing so that the one or more power terminals are exposed outside the lamp casing and the load connecting portions are exposed inside the lamp casing.

11. The vehicle-mounted load controller according to claim 1, wherein the vehicle-mounted load controller is for use in a vehicle-mounted lamp fitting including:

a box-shaped lamp casing installed in a vehicle; and a plurality of loads each having a light source including a light-emitting portion and a power supply terminal portion, the lamp casing having openings formed therein through which the light-emitting portions of the loads are inserted into the lamp casing, the power supply terminal portions each being provided in a portion of each of the loads, the portion facing the lamp casing in a state where the light-emitting portion is inserted into the lamp casing through the opening, the lamp casing having a connector portion provided on a peripheral portion of the openings, the connector portion being electrically connected to the power supply terminal portions of the loads with the light-emitting portions inserted into the lamp casing through the openings, the loads being attached to the lamp casing with the light-emitting portions inserted into the openings and with the power supply terminal portions connected to the connector portion, and the load connecting portions are electrically connected to the connector portion.

12. The vehicle-mounted load controller according to claim 1, wherein the vehicle-mounted load controller is for use in a vehicle-mounted lamp fitting including:

a box-shaped lamp casing installed in a vehicle; and a plurality of loads including a light source, the vehicle-mounted load controller further comprising a plurality of load connecting portions corresponding respectively to all the loads provided in the vehicle-mounted lamp fitting.

13. The vehicle-mounted load controller according to claim 1, further comprising:

a load connecting portion for a high-intensity discharge lamp to which a high-intensity discharge lamp is electrically connected; and a lighting circuit unit arranged between the load connecting portion for a high-intensity discharge lamp and one of the one or more power terminals, the lighting circuit unit generating power for the high-intensity discharge lamp from electric power obtained from the power line connected to the one power terminal and supplying the power to the high-intensity discharge lamp connected to the load connecting portion for a high-intensity discharge lamp.

14. The vehicle-mounted load controller according to claim 1, wherein the plurality of load connecting portions include a load connecting portion to which a light source for a headlight is connected.

15. The vehicle-mounted load controller according to claim 1, wherein the plurality of load connecting portions include a load connecting portion to which a light source for a taillight is connected.

16. A vehicle-mounted headlight device, comprising:

a vehicle-mounted lamp fitting including:

a box-shaped lamp casing installed in a front face of a vehicle; and a plurality of loads including at least a light source for a headlight attached to the lamp casing; and a vehicle-mounted load controller including:

one or more power terminals connected to one or more power lines of a vehicle-mounted DC power supply through a fuse, respectively;

a plurality of load connecting portions connected to the plurality of loads, respectively;

switches configured to correspond to the plurality of load connecting portions, respectively, each of the switches starting and stopping supply of power from the power line connected to one of the one or more power terminals to a one of the plurality of loads connected to the corresponding load connecting portion; and a control unit configured to control the switches in response to inputted control signals, wherein two or more of the plurality of load connecting portions are electrically connected to at least one of the one or more power terminals, and each of the switches stops the supply of power from the power line to the load connected to the corresponding load connecting portion when magnitude of current flowing through the load connected to the corresponding load connecting portion reaches or exceeds a predetermined value.

17. A vehicle-mounted taillight device, comprising:
a vehicle-mounted lamp fitting including:
   a box-shaped lamp casing installed in a rear face of a vehicle; and
   a plurality of loads including at least a light source for a taillight attached to the lamp casing; and
a vehicle-mounted load controller including:
   one or more power terminals connected to one or more power lines of a vehicle-mounted DC power supply through a fuse, respectively;
   a plurality of load connecting portions connected to the plurality of loads, respectively;
   switches configured to correspond to the plurality of load connecting portions, respectively, each of the switches starting and stopping supply of power from the power line connected to one of the one or more power terminals to one of the plurality of loads connected to the corresponding load connecting portion; and
   a control unit configured to control the switches in response to inputted control signals,
wherein two or more of the plurality of load connecting portions are electrically connected to at least one of the one or more power terminals, and
each of the switches stops the supply of power from the power line to the load connected to the corresponding load connecting portion when magnitude of current flowing through the load connected to the corresponding load connecting portion reaches or exceeds a predetermined value.

* * * * *

UNITED STATES PATENT AND TRADEMARK OFFICE
CERTIFICATE OF CORRECTION

PATENT NO. : 8,330,374 B2
APPLICATION NO. : 12/667714
DATED : December 11, 2012
INVENTOR(S) : Toshifumi Tanaka et al.

It is certified that error appears in the above-identified patent and that said Letters Patent is hereby corrected as shown below:

In the Claims:

At column 40, line 60 (claim 16, line 17) of the printed patent, the term "a" should be deleted after to.

Signed and Sealed this
Sixteenth Day of July, 2013

Teresa Stanek Rea
*Acting Director of the United States Patent and Trademark Office*